(12) United States Patent
Hazelden

(10) Patent No.: US 9,485,020 B2
(45) Date of Patent: Nov. 1, 2016

(54) REMOTE SENSING DEVICE AND MONITORING APPARATUS

(71) Applicant: TRW Limited, Solihull West Midlands (GB)

(72) Inventor: Roger John Hazelden, Tamworth West Midlands (GB)

(73) Assignee: TRW Limited, Solihull West Midlands (GB)

( * ) Notice: Subject to any disclaimer, the term of this patent is extended or adjusted under 35 U.S.C. 154(b) by 0 days.

(21) Appl. No.: 14/413,738

(22) PCT Filed: Jul. 10, 2013

(86) PCT No.: PCT/GB2013/051819
§ 371 (c)(1),
(2) Date: Jan. 9, 2015

(87) PCT Pub. No.: WO2014/009720
PCT Pub. Date: Jan. 16, 2014

(65) Prior Publication Data
US 2015/0162981 A1    Jun. 11, 2015

(30) Foreign Application Priority Data

Jul. 10, 2012    (GB) .................................. 1212258.6
Feb. 28, 2013    (GB) .................................. 1303618.1

(51) Int. Cl.
*G02B 26/00*    (2006.01)
*H04B 10/112*    (2013.01)
(Continued)

(52) U.S. Cl.
CPC ......... *H04B 10/1123* (2013.01); *G01C 13/008* (2013.01); *G01C 15/02* (2013.01); *G02B 26/0833* (2013.01); *G02B 26/0841* (2013.01); *B63B 2022/006* (2013.01)

(58) Field of Classification Search
CPC  H04B 10/1123; G01C 15/02; G01C 13/008; G02B 26/0841; G02B 26/0388; B63B 2022/006
See application file for complete search history.

(56) References Cited

U.S. PATENT DOCUMENTS 6,944,403 B2    9/2005  Margalit et al.
7,983,565 B2    7/2011  Varshneya et al.
(Continued)

FOREIGN PATENT DOCUMENTS

DE    102010053614 A1    6/2012
GB    2475970 A    6/2011
(Continued)

OTHER PUBLICATIONS

International Search Report, Application No. PCT/GB2013/051819, dated Aug. 28, 2013.
(Continued)

*Primary Examiner* — Tony Ko
(74) *Attorney, Agent, or Firm* — MacMillan, Sobanski & Todd, LLC

(57) ABSTRACT

A remote sensor device comprises at least one sensor that produces an output signal indicative of the value of a measure, and a reflective display that is positioned such that it is visible along a line of sight from a remote location, the reflective display comprising at least two retro-reflective assemblies, each of which is arranged to reflect a variable fraction of radiation incident upon the reflective assembly back towards a source in response to respective control signals applied to the reflector assemblies. Each of the reflector assemblies preferentially reflects one wavelength of the incident radiation or preferentially removes at least one wavelength of the incident radiation that is not preferentially reflected or removed by the other reflector assembly. The device further comprises modulating means for modulating the control signals applied to the reflector assemblies as a function of the value of the output signal from the sensor so as to modulate the fractions of incident light reflected by the display.

22 Claims, 15 Drawing Sheets

(51) Int. Cl.
*G01C 13/00* (2006.01)
*G02B 26/08* (2006.01)
*G01C 15/02* (2006.01)
*B63B 22/00* (2006.01)

(56) References Cited

U.S. PATENT DOCUMENTS

2010/0028021 A1* 2/2010 Shimada ............ H04B 10/2587
  398/172
2011/0128625 A1 6/2011 Larsen et al.
2011/0292485 A1 12/2011 Klotzkin et al.
2012/0140224 A1 6/2012 Switkes et al.

FOREIGN PATENT DOCUMENTS

WO 9959271 A1 11/1999
WO 2006086029 A2 8/2006
WO 2011085526 A1 7/2011

OTHER PUBLICATIONS

Patents Act 1977: Search Report Under Section 17, Application No. GB1212258.6, dated Nov. 12, 2012.
Patents Act 1977: Search Report Under Section 17, Application No. GB1303618.1, dated Jul. 12, 2013.

* cited by examiner

| R | Y | G | B | Label | R | Y | G | B | Depth | R | Y | G | B | ID | R | Y | G | B | ID |
|---|---|---|---|---|---|---|---|---|---|---|---|---|---|---|---|---|---|---|---|
| 1 | 1 | 1 | 1 | Don't use | 2 | 1 | 1 | 1 | Depth = 3.9 | 3 | 1 | 1 | 1 | ID = 1 | 4 | 1 | 1 | 1 | ID = 65 |
| 1 | 1 | 1 | 2 | Spare | 2 | 1 | 1 | 2 | Depth = 4 | 3 | 1 | 1 | 2 | ID = 2 | 4 | 1 | 1 | 2 | ID = 66 |
| 1 | 1 | 1 | 3 | Spare | 2 | 1 | 1 | 3 | Depth = 4.1 | 3 | 1 | 1 | 3 | ID = 3 | 4 | 1 | 1 | 3 | ID = 67 |
| 1 | 1 | 1 | 4 | Spare | 2 | 1 | 1 | 4 | Depth = 4.2 | 3 | 1 | 1 | 4 | ID = 4 | 4 | 1 | 1 | 4 | ID = 68 |
| 1 | 1 | 2 | 1 | Spare | 2 | 1 | 2 | 1 | Depth = 4.3 | 3 | 1 | 2 | 1 | ID = 5 | 4 | 1 | 2 | 1 | ID = 69 |
| 1 | 1 | 2 | 2 | Spare | 2 | 1 | 2 | 2 | Depth = 4.4 | 3 | 1 | 2 | 2 | ID = 6 | 4 | 1 | 2 | 2 | ID = 70 |
| 1 | 1 | 2 | 3 | Spare | 2 | 1 | 2 | 3 | Depth = 4.5 | 3 | 1 | 2 | 3 | ID = 7 | 4 | 1 | 2 | 3 | ID = 71 |
| 1 | 1 | 2 | 4 | Spare | 2 | 1 | 2 | 4 | Depth = 4.6 | 3 | 1 | 2 | 4 | ID = 8 | 4 | 1 | 2 | 4 | ID = 72 |
| 1 | 1 | 3 | 1 | Spare | 2 | 1 | 3 | 1 | Depth = 4.7 | 3 | 1 | 3 | 1 | ID = 9 | 4 | 1 | 3 | 1 | ID = 73 |
| 1 | 1 | 3 | 2 | Spare | 2 | 1 | 3 | 2 | Depth = 4.8 | 3 | 1 | 3 | 2 | ID = 10 | 4 | 1 | 3 | 2 | ID = 74 |
| 1 | 1 | 3 | 3 | Spare | 2 | 1 | 3 | 3 | Depth = 4.9 | 3 | 1 | 3 | 3 | ID = 11 | 4 | 1 | 3 | 3 | ID = 75 |
| 1 | 1 | 3 | 4 | Spare | 2 | 1 | 3 | 4 | Depth = 5 | 3 | 1 | 3 | 4 | ID = 12 | 4 | 1 | 3 | 4 | ID = 76 |
| 1 | 1 | 4 | 1 | Spare | 2 | 1 | 4 | 1 | Depth = 5.1 | 3 | 1 | 4 | 1 | ID = 13 | 4 | 1 | 4 | 1 | ID = 77 |
| 1 | 1 | 4 | 2 | Spare | 2 | 1 | 4 | 2 | Depth = 5.5 | 3 | 1 | 4 | 2 | ID = 14 | 4 | 1 | 4 | 2 | ID = 78 |
| 1 | 1 | 4 | 3 | Spare | 2 | 1 | 4 | 3 | Depth = 5.3 | 3 | 1 | 4 | 3 | ID = 15 | 4 | 1 | 4 | 3 | ID = 79 |
| 1 | 1 | 4 | 4 | Spare | 2 | 1 | 4 | 4 | Depth = 5.4 | 3 | 1 | 4 | 4 | ID = 16 | 4 | 1 | 4 | 4 | ID = 80 |
| 1 | 2 | 1 | 1 | Spare | 2 | 2 | 1 | 1 | Depth = 5.5 | 3 | 2 | 1 | 1 | ID = 17 | 4 | 2 | 1 | 1 | ID = 81 |
| 1 | 2 | 1 | 2 | Spare | 2 | 2 | 1 | 2 | Depth = 5.6 | 3 | 2 | 1 | 2 | ID = 18 | 4 | 2 | 1 | 2 | ID = 82 |
| 1 | 2 | 1 | 3 | Spare | 2 | 2 | 1 | 3 | Depth = 5.7 | 3 | 2 | 1 | 3 | ID = 19 | 4 | 2 | 1 | 3 | ID = 83 |
| 1 | 2 | 1 | 4 | Spare | 2 | 2 | 1 | 4 | Depth = 5.8 | 3 | 2 | 1 | 4 | ID = 20 | 4 | 2 | 1 | 4 | ID = 84 |
| 1 | 2 | 2 | 1 | Spare | 2 | 2 | 2 | 1 | Depth = 5.9 | 3 | 2 | 2 | 1 | ID = 21 | 4 | 2 | 2 | 1 | ID = 85 |

| | | | | Label | | | | | | | | | Depth | | | | | | | | ID |
|---|---|---|---|---|---|---|---|---|---|---|---|---|---|---|---|---|---|---|---|---|---|
| 1 | 2 | 2 | 2 | Spare | | 2 | 2 | 2 | 2 | 3 | 2 | 2 | | 3 | 2 | 4 | | | | | ID = 86 |
| 1 | 2 | 2 | 3 | Spare | | 2 | 2 | 2 | 3 | 3 | 2 | 2 | | 3 | 2 | 2 | | | | | ID = 87 |
| 1 | 2 | 2 | 4 | Spare | | 2 | 2 | 2 | 4 | 3 | 2 | 2 | | 3 | 2 | 4 | | | | | ID = 88 |
| 1 | 3 | 3 | 1 | Spare | | 3 | 2 | 3 | 1 | 3 | 3 | 2 | | 3 | 3 | 1 | | | | | ID = 89 |
| 1 | 3 | 3 | 2 | Spare | | 3 | 2 | 3 | 2 | 3 | 3 | 2 | | 3 | 3 | 2 | | | | | ID = 90 |
| 1 | 3 | 3 | 3 | Spare | | 3 | 2 | 3 | 3 | 3 | 3 | 2 | | 3 | 3 | 3 | | | | | ID = 91 |
| 1 | 3 | 3 | 4 | Spare | | 3 | 2 | 3 | 4 | 3 | 3 | 2 | | 3 | 3 | 4 | | | | | ID = 92 |
| 1 | 4 | 4 | 1 | Spare | | 4 | 2 | 4 | 1 | 3 | 4 | 2 | | 3 | 4 | 1 | | | | | ID = 93 |
| 1 | 4 | 4 | 2 | Depth = <0.5 | 6 | 4 | 2 | 4 | 2 | 3 | 4 | 2 | Depth = 6.8 | 3 | 4 | 2 | | | | | ID = 94 |
| 1 | 4 | 4 | 3 | Depth = 0.5 | 6.1 | 4 | 2 | 4 | 3 | 3 | 4 | 2 | Depth = 6.9 | 3 | 4 | 3 | | | | | ID = 95 |
| 1 | 4 | 4 | 4 | Depth = 0.6 | 6.2 | 4 | 2 | 4 | 4 | 3 | 4 | 2 | Depth = 7 | 3 | 4 | 4 | | | | | ID = 96 |
| 1 | 1 | 1 | 1 | Depth = 0.7 | 6.3 | 1 | 3 | 1 | 1 | 3 | 1 | 3 | Depth = 7.1 | 3 | 1 | 1 | | | | | ID = 97 |
| 1 | 1 | 1 | 2 | Depth = 0.8 | 6.4 | 1 | 3 | 1 | 2 | 3 | 1 | 3 | Depth = 7.2 | 3 | 1 | 2 | | | | | ID = 98 |
| 1 | 1 | 1 | 3 | Depth = 0.9 | 6.5 | 1 | 3 | 1 | 3 | 3 | 1 | 3 | Depth = 7.3 | 3 | 1 | 3 | | | | | ID = 99 |
| 1 | 1 | 1 | 4 | Depth = 1 | 6.6 | 1 | 3 | 1 | 4 | 3 | 1 | 3 | Depth = 7.4 | 3 | 1 | 4 | | | | | ID = 100 |
| 1 | 2 | 2 | 1 | Depth = 1.1 | 6.7 | 2 | 3 | 2 | 1 | 3 | 2 | 3 | Depth = 7.5 | 3 | 2 | 1 | | | | | ID = 101 |
| 1 | 2 | 2 | 2 | Depth = 1.2 | | 2 | 3 | 2 | 2 | 3 | 2 | 3 | Depth = 7.6 | 3 | 2 | 2 | | | | | ID = 102 |
| 1 | 2 | 2 | 3 | Depth = 1.3 | | 2 | 3 | 2 | 3 | 3 | 2 | 3 | Depth = 7.7 | 3 | 2 | 3 | | | | | ID = 103 |
| 1 | 3 | 3 | 4 | Depth = 1.4 | | 3 | 3 | 3 | 4 | 3 | 3 | 3 | Depth = 7.8 | 3 | 3 | 4 | | | | | ID = 104 |
| 1 | 3 | 3 | 1 | Depth = 1.5 | | 3 | 3 | 3 | 1 | 3 | 3 | 3 | Depth = 7.9 | 3 | 3 | 1 | | | | | ID = 105 |
| 1 | 3 | 3 | 2 | Depth = 1.6 | | 3 | 3 | 3 | 2 | 3 | 3 | 3 | Depth = 8 | 3 | 3 | 2 | | | | | ID = 106 |
| 1 | 3 | 3 | 3 | Depth = 1.7 | | 3 | 3 | 3 | 3 | 3 | 3 | 3 | Depth = 8.1 | 3 | 3 | 3 | | | | | ID = 107 |

Figure 9 (Cont.)

| 1 | 3 | 3 | 4 | Depth = 1.8 | 2 | 3 | 3 | 4 | 3 | 3 | 3 | 4 | Depth = 8.2 | 4 | 3 | 3 | 4 | ID = 44 | 4 | 3 | 3 | 4 | ID = 108 |
|---|---|---|---|---|---|---|---|---|---|---|---|---|---|---|---|---|---|---|---|---|---|---|---|
| 1 | 3 | 4 | 1 | Depth = 1.9 | 2 | 3 | 4 | 1 | 3 | 3 | 3 | 1 | Depth = 8.3 | 4 | 3 | 4 | 1 | ID = 45 | 4 | 3 | 4 | 1 | ID = 109 |
| 1 | 3 | 4 | 2 | Depth = 2 | 2 | 3 | 4 | 2 | 3 | 3 | 3 | 2 | Depth = 8.4 | 4 | 3 | 4 | 2 | ID = 46 | 4 | 3 | 4 | 2 | ID = 110 |
| 1 | 3 | 4 | 3 | Depth = 2.1 | 2 | 3 | 4 | 3 | 3 | 3 | 3 | 3 | Depth = 8.5 | 4 | 3 | 4 | 3 | ID = 47 | 4 | 3 | 4 | 3 | ID = 111 |
| 1 | 3 | 4 | 4 | Depth = 2.2 | 2 | 3 | 4 | 4 | 3 | 3 | 3 | 4 | Depth = 8.6 | 4 | 3 | 4 | 4 | ID = 48 | 4 | 3 | 4 | 4 | ID = 112 |
| 1 | 4 | 1 | 1 | Depth = 2.3 | 2 | 4 | 1 | 1 | 3 | 3 | 4 | 1 | Depth = 8.7 | 4 | 3 | 1 | 1 | ID = 49 | 4 | 3 | 1 | 1 | ID = 113 |
| 1 | 4 | 1 | 2 | Depth = 2.4 | 2 | 4 | 1 | 2 | 3 | 3 | 4 | 2 | Depth = 8.8 | 4 | 3 | 1 | 2 | ID = 50 | 4 | 4 | 1 | 2 | ID = 114 |
| 1 | 4 | 1 | 3 | Depth = 2.5 | 2 | 4 | 1 | 3 | 3 | 3 | 4 | 3 | Depth = 8.9 | 4 | 3 | 1 | 3 | ID = 51 | 4 | 4 | 1 | 3 | ID = 115 |
| 1 | 4 | 1 | 4 | Depth = 2.6 | 2 | 4 | 1 | 4 | 3 | 3 | 4 | 4 | Depth = 9 | 4 | 3 | 1 | 4 | ID = 52 | 4 | 4 | 1 | 4 | ID = 116 |
| 1 | 4 | 2 | 1 | Depth = 2.7 | 2 | 4 | 2 | 1 | 3 | 3 | 4 | 1 | Depth = 9.1 | 4 | 4 | 2 | 1 | ID = 53 | 4 | 4 | 2 | 1 | ID = 117 |
| 1 | 4 | 2 | 2 | Depth = 2.8 | 2 | 4 | 2 | 2 | 3 | 3 | 4 | 2 | Depth = 9.2 | 4 | 4 | 2 | 2 | ID = 54 | 4 | 4 | 2 | 2 | ID = 118 |
| 1 | 4 | 2 | 3 | Depth = 2.9 | 2 | 4 | 2 | 3 | 3 | 3 | 4 | 3 | Depth = 9.3 | 4 | 4 | 2 | 3 | ID = 55 | 4 | 4 | 2 | 3 | ID = 119 |
| 1 | 4 | 2 | 4 | Depth = 3 | 2 | 4 | 2 | 4 | 3 | 3 | 4 | 4 | Depth = 9.4 | 4 | 4 | 3 | 1 | ID = 56 | 4 | 4 | 3 | 1 | ID = 120 |
| 1 | 4 | 3 | 1 | Depth = 3.1 | 2 | 4 | 3 | 1 | 3 | 3 | 4 | 1 | Depth = 9.5 | 4 | 4 | 3 | 2 | ID = 57 | 4 | 4 | 3 | 2 | ID = 121 |
| 1 | 4 | 3 | 2 | Depth = 3.2 | 2 | 4 | 3 | 2 | 3 | 3 | 4 | 2 | Depth = 9.6 | 4 | 4 | 3 | 3 | ID = 58 | 4 | 4 | 3 | 3 | ID = 122 |
| 1 | 4 | 3 | 3 | Depth = 3.3 | 2 | 4 | 3 | 3 | 3 | 3 | 4 | 3 | Depth = 9.7 | 4 | 4 | 3 | 4 | ID = 59 | 4 | 4 | 3 | 4 | ID = 123 |
| 1 | 4 | 3 | 4 | Depth = 3.4 | 2 | 4 | 3 | 4 | 3 | 3 | 4 | 4 | Depth = 9.8 | 4 | 4 | 4 | 1 | ID = 60 | 4 | 4 | 3 | 3 | ID = 124 |
| 1 | 4 | 4 | 1 | Depth = 3.5 | 2 | 4 | 4 | 1 | 3 | 3 | 4 | 1 | Depth = 9.9 | 4 | 4 | 4 | 2 | ID = 61 | 4 | 4 | 4 | 1 | ID = 125 |
| 1 | 4 | 4 | 2 | Depth = 3.6 | 2 | 4 | 4 | 2 | 3 | 3 | 4 | 2 | Depth = 10 | 4 | 4 | 4 | 3 | ID = 62 | 4 | 4 | 4 | 2 | ID = 126 |
| 1 | 4 | 4 | 3 | Depth = 3.7 | 2 | 4 | 4 | 3 | 3 | 3 | 4 | 3 | Depth = >10 | 4 | 4 | 4 | 3 | ID = 63 | 4 | 4 | 4 | 3 | ID = 127 |
| 1 | 4 | 4 | 4 | Depth = 3.8 | 2 | 4 | 4 | 4 | 3 | 3 | 4 | 3 | Reference | 4 | 4 | 4 | 3 | ID = 64 | 4 | 4 | 4 | 4 | Reference |

“REMOTE SENSING DEVICE AND MONITORING APPARATUS

CROSS-REFERENCE TO RELATED APPLICATIONS

This application is a national stage of International Application No. PCT/GB2013/051819 filed Jul. 10, 2013, the disclosures of which are incorporated herein by reference in entirety, and which claimed priority to Great Britain Patent Application No. 1212258.6 filed Jul. 10, 2012 and Great Britain Patent Application No. 1303618.1 filed Feb. 28, 2013, the disclosures of which are incorporated herein by reference in entirety.

BACKGROUND OF THE INVENTION

This invention relates to improvements in remote sensing devices, and to a method of remotely interrogating one or more sensors.

It is known to provide one or more sensing devices which can be deployed in a region that is to be monitored and which can then be interrogated remotely. By remotely interrogated we mean that the sensor device can be interrogated by a suitable monitoring apparatus located a distance away from the sensor device, without physical contact between the monitoring apparatus and the sensor device.

A well known application of remote sensing devices is the tracking of animals in the wild. The animals can be fitted with a radio transmitter which emits a coded electromagnetic (radio frequency) signal. An operator, equipped with a suitable radio receiver and directional antenna can detect the signal from the radio transmitter. The detected signal will be strongest when the antenna is pointed at the radio transmitter, Thus, although a dedicated sensing device is not fitted to the animal along with the radio transmitter the directionality of the signal enables the operator to track the animal across even the most challenging terrain. Information about the location and movement of the animal overtime may be used to learn about the animal's behaviour. Of course, a sensor may be provided along with the radio transmitter, such as a heart rate monitor, and the sensed data can be transmitted by the radio transmitter.

Alternatives to radio transmitter based remote sensing devices include devices which Global Positioning transmitters (GPS). The transmitters send a signal indicating the precise location of the sensing device to a suitable monitoring device. Many commercial vehicles are fitted with tracking devices of this type, and as well as transmitting the location of the vehicle also transmit information about the operating conditions of the vehicle, such as speed, engine revolutions per minute, fluid temperatures and the like. Highly specialised tracking devices are used on racing vehicles to allow the behaviour of the vehicles to be monitored during a race.

In both cases, the remote sensor devices rely on the transmission of radio frequency electromagnetic signals back to a suitable monitoring apparatus. The applicant has appreciated that such signals may not always be effective or desirable. For instance, if the area in which the sensor device is located is electromagnetically noisy, the signal may be swamped. The device may be located in an area in which electromagnetic shielding is present, or perhaps in an area in which it is not acceptable to emit electromagnetic signals. Many scientific experiments can only be carried out in a controlled environment where electromagnetic signals may disrupt the outcome of the experiment. The need to emit a radio signal also has a detrimental effect on battery life of the remote sensor device, limiting the time it can be left in service without maintenance.

BRIEF SUMMARY OF THE INVENTION

According to a first aspect the invention provides a remote sensor device comprising:
 at least one sensor that produces an output signal indicative of the value of a measurand;
 a reflective display that is positioned such that it is visible along a line of sight from a remote location, the reflective display comprising at least two reflector assemblies, each of which is arranged to reflect a variable proportion of radiation incident upon the reflective assembly back towards the radiation source in response to respective control signals applied to the reflector assemblies,
 and in which each of the reflector assemblies preferentially reflects at least one wavelength, or preferentially removes at least one wavelength, that is not preferentially reflected or preferentially removed, by the other reflector assembly,
 and further comprising modulating means for modulating the control signals applied to the reflector assemblies as a function of the value of the output signal from the sensor so as to modulate the fractions of incident light reflected by the display.

The remote sensor device therefore uses variations in a pattern of reflectivity of a display across at least two different wavelengths within a band of wavelengths which in use enable it to encode a signal onto a reflected fraction of incident radiation and thereby communicate to a monitoring device passively rather than emitting radiation as is known in prior art RF devices. The information may be encoded in the reflected signal in the frequency and/or time domain, and not in the spatial domain.

By preferentially reflecting we mean that an assembly reflects that wavelength strongly in preference to the fraction of other wavelengths it reflects. By preferentially removing a wavelength we mean that an assembly preferentially reflects that wavelength less than it reflects other adjacent wavelengths. The former will produce a strong peak in reflectivity when illuminated with a wideband source and the later and strong trough in reflectivity, akin to a bandpass or bandstop filter. The display may be strongly retro-reflective so that the encoded reflected signal is directed primarily back towards the source of the incident radiation with little or none of the fraction of radiation reflected being directed elsewhere.

The passive sensor device can be interrogated remotely by shining broadband radiation upon the display across the band of wavelengths which are preferentially reflected (or removed) by the display back towards a source and then monitoring the light reflected back from the display at those different regions in the band. Depending on the encoding scheme used by the modulation means may enable the measurement made by the sensor and optionally, as will be explained, the identity of the sensor device, to be encoded in the retro-reflected radiation.

Each of the reflector assemblies of the display may comprise two or more individual reflector devices, each reflector device being controllable between a first state in which the reflector reflects light back along the first path and a second state in which a smaller fraction of incident radiation is retroreflected back along the first path. The devices may be retro-reflective, so that they strongly direct incident radiation back in the direction it came from rather than scattering the reflected radiation in many directions.

The reflectors may be altered between the first state and the second state by a transducer which in response to a control signal moves the reflector between two positions, a first position corresponding to the first state and a second position corresponding to the second state.

In an alternative each reflector device may include a shutter which in the first state permits incident radiation to be reflected from the reflector and in the second state blocks light from being reflected by the reflector. The filter or shutter may scatter, absorb, or deflect incident radiation when in the second state, and permit the radiation to pass through in the first state.

In a preferred arrangement, each of the reflector devices may comprise a micro-electrical mechanical device in which a reflector is secured to a deformable substrate, the substrate deforming when a control signal is applied to it to deform or move the reflector.

Alternatively, the control signals may modulate the filter or shutter, where provided, to vary the amount of radiation that can pass through onto a reflector and thereby vary the proportion of radiation that is retroreflected by the backing layer.

In another arrangement each device may comprise a micro-electro mechanical device comprising a reflector element connected to a transducer, the transducer in response to a control signal modifying the shape of the reflective surface. In a first state the surface may be substantially flat, and in a second state it may be deformed such that it functions as a diffractive grating.

Each reflector assembly may comprise two, or three, or four or more reflector devices, each being controlled by a respective control signal from the modulating means between the first and second states. It may comprise less than ten, or less than 6, reflector devices.

To provide the distinct preferential wavelength responsiveness of each reflector assembly, one or more of the assemblies may include a filter. Preferably all of the assemblies include a filter.

Each filter may have a different wavelength response, for example in the visible band of incident radiation, i.e. for reflecting visible light. This will enable the sensor device to encode information in an overall reflected portion of incident visible spectrum light. The filters may be bandpass or bandstop filters.

For example, one reflector assembly may include a red filter so that the retro-reflected light appears red, another may include a green filter so that the reflected light appears green, and another a blue filter so that the reflected light appears blue. The overall intensity of each colour, red/blue/green reflected by the sensor device can then be varied by modulation of the control signals, and hence the overall colour of the display, represented by the relative proportions of each reflected colour, can be varied. The colour will be apparent when the display is illuminated with white light, and can be detected using a suitable colour detector such as a colour camera or CCD array.

The modulation means may produce control signals that cause the display to be modulated in a variety of different ways to encode the output signal.

In one modulation scheme, each device may therefore encode the output signal using amplitude modulation by varying the fraction of incident radiation retro-reflected from each of the assemblies The modulating means may be adapted to modulate the control signals applied to the retro-reflective assemblies as a function of a code representing an identity of the remote sensor device.

The modulation means may use an amplitude modulation scheme in which the relative fractions of radiation reflected by each of the assemblies at a moment in time encodes the output signal. Therefore, for any given value of the output signal the overall pattern or "colour" of the display will be unique. By overall colour we mean the colour represented by combining the two or three or more differently coloured fractions of incident light that are reflected by the reflector assemblies.

In the case of incident visible light, with each assembly preferentially reflecting a respective colour, the effect of this modulation scheme will be to vary the perceived colour of the overall display when viewed using a suitably responsive detector.

For example, each reflector assembly may represent one digit of a multi-bit digital code, the number of bits being equal to the number of states that each assembly can be in. By state we mean the number of different fractions of incident light that can be retro-reflected. An assembly that has four states, for example, may reflect 100 percent, 75 percent, 50 percent or 25 percent of the incident radiation at its preferential wavelength (radiation above and below that wavelength being retroreflected at very low fractions).

Where each reflector assembly can be in two states, each digit will be a binary digit as it can have any one of four values—all detectors off, one on, the other one on and all on. The total possible number of states that can be encoded will be the number of assemblies to the power of the number of digits of each assembly (assuming each assembly has the same number of devices).

In one arrangement, the reflector assemblies may be periodically switched between at least two different encoding states, the fraction of radiation reflected by the assemblies in each of the states being different.

One encoding state may comprise a reference state in which the fraction reflected by each assembly has a fixed value, the other state encoding the output signal.

The reference state may be used by a detector observing the display to compensate for any wavelength dependent changes in behaviour of the device, which would affect the reference state as well as any state of the device in between reference states.

The fixed value may be indicative of the identity of the remote sensor device.

For example, where the display is modulated to change colour to provide an indication of the output signal, the colour of the device may be periodically switched to the reference state colour. This reference state colour could encode information indicative of the identity of the remote sensor device, such as a unique ID code. This enables two values to be encoded, one for the sensor output and the other for the id, the values being alternately displayed.

In an alternative the modulating means may generate control signals which cause the display to encode the output signal using a time domain modulation by varying the fractions of radiation retro-reflected by one or more of the assemblies as a function of time.

In one arrangement, the reflector assemblies may be periodically switched between at least two different encoding states, the fraction of radiation reflected by the assemblies in each of the states being different, and the mark space ratio of the two states encoding information.

The time dependent modulation may be used to encode the output signal value, or to encode a unique identity value assigned to the device.

The time domain modulation may switch into and out of the reference state with a frequency of between 10 Hz and 100 Hz, or between 10 Hz and 1 KHz, or at a higher frequency.

The modulation means may combine amplitude modulation and time domain modulation, with one of the modulation schemes encoding the output signal and the other an identity of the remote sensor device or some other information such as a second output signal from a second sensor.

Where a reference state is provided for the display, the state may correspond to the state in which all of the reflector assemblies reflect the maximum proportion of incident radiation that they are able to reflect. Where each assembly comprises multiple reflector devices this will correspond to all devices being switched on and retro-reflecting radiation back along the incident path.

Providing a known reference state gives a reference level of reflectivity from which the relative reflectivity of the assemblies when they are not in the reference state can be determined.

With another the device within the scope of at least one aspect of the present invention, the measured value is not encoded as a spatial pattern, but comprises a pattern set in the frequency domain by varying the proportion of radiation reflected at different wavelengths across a waveband. In practice each reflector assembly may be offset from the others spatially, but this spatial information does not form a part of the encoding of the information. There is therefore no need for a monitoring device to be able to spatially resolve the light reflected from the reflective display, it merely needs to monitor the overall amplitude of the reflective signal at various points across the waveband.

To make the encoding easier to interpret remotely, the preferential wavelength reflectivity of each reflector assembly may comprise peaks of reflectivity which are separated from any further peaks in the band by a relatively wide continuous region of relatively low reflectivity. Ideally the optical display will not reflect at all between peaks. The width of the peaks may be less than the width of the spaces between peaks.

To aid reading of the encoding, the location of the regions of waveband which contain a binary digit may be pre-defined. This allows the sensor device to be read without looking at the reflectivity across the whole band of wavelengths. Instead, monitoring the discrete regions where a binary digit is present is sufficient. This is possible by setting the wavelength sensitivity of each reflector assembly at known, predefined, wavelengths. For instance, as mentioned they may be set for Red, Green and Blue in the visible waveband.

Although sensitivity to visible light has been mentioned for ease of explanation, It is preferred that the band of wavelengths corresponds to wavelengths outside of the range of human eyes, for instance light in the Infra red region. A waveband of substantially 800 nm to substantially 900 nm may be used, divided into 10 nm regions which each represent a digit.

The use of IR wavebands has the advantage that the display is not distracting to any person or animal that can see the sensor device. It is most preferred that the optical display, and indeed all other visible parts of the sensor device, have a very low reflectivity in the visible spectrum, or are perhaps coloured to match their environment. A sensor for use in water may be blue or grey for instance, and for use on sand may be camel coloured.

The processing circuit may include a code generator which receives as an input the output signal from the sensor and produces at an output a coded signal that can be used by the modulating means to modulate the fraction of incident radiation reflected by each assembly of the reflective display.

The code generator may, where appropriate, produce at an output a second coded signal that can be used by the modulating means to modulate the reflectivity of the display as function of the identity of the device.

The encoded identity may comprise a unique identifier for the device.

The sensor device can be interrogated remotely provided that there is a clear line of sight from the monitoring device and the sensor device. To help ensure that the reflective display will be in the line of sight, the sensor device may include a reflective display that covers a large portion of its surface. It may, for instance comprise a spherical body or housing with the display covering substantially all of the surface of the spherical body or housing, or at least covering enough of the surface that a portion of the display can be seen from a given vantage point for any orientation of the sensor device.

The applicant has appreciated that the device could be interrogated by a monitoring device that is fitted to a monitoring balloon or airplane or helicopter or the like or even a satellite, in which case it is sufficient that the optical display faces directly upwards when the sensor device is in use. The display may therefore be fitted only to one part of the sensor device so that it can be seen from above but not from the side.

The sensor device may include a battery that powers the sensor, and a battery that powers the processing means and a battery that powers the means for modulating the display. A single battery providing all these parts may be provided, or a set of batteries connected in parallel. The use of batteries enables the sensor device to operate away from a mains power source, the length of time it operates being at least partially dependent on the capacity of the battery or batteries.

The battery may be water activated. Where located in a housing, the housing may include one or more pores which allow water to enter and wet the battery to activate it.

In other arrangements the battery may be omitted and another power source used such as a solar panel. Where the sensor device is to be deployed in water the power could be extracted from the movement of the water, as is known from research into wave power extraction.

The sensor device may include a housing which contains at least the processing circuit.

The sensor device may include a buoyancy device which enables the remote sensor device to float in water, or perhaps to float in the air. The device may be configured so that when floating it adopts a defined orientation, e.g. it always floats the "right way up". At least one display may be provided which faces upwards when the device is the right way up.

The remote sensor device may be at least partially, and in some cases almost entirely, of biodegradable material. This allows the sensor pod to be left in the field to degrade rather than having to be collected and reused or disposed of. The electronics used may be predominantly plastic, and the batteries could be water activated and largely biodegradable. The device may have a service life of only a few minutes from when deployed, enough time to take readings from the sensors, before the power runs out and the device starts to degrade.

The sensor of the sensor device may be adapted to monitor any one or more of a wide range of measurands. It may measure parameters outside of the sensor device associated with the environment in which the sensor device is located. Examples include ultrasonic sensors for measuring distance or depth, such as the depth of a body of water on which the device is floating (either at, above or below the surface of the water), temperature sensors, heart rate sensors, speed sensors, position sensors, levels of radiation such as alpha, gamma or beta wave radiation, and the like. It may measure internal parameters of the sensor device, such as internal temperature, battery condition and so on. In a simple arrangement the sensor may include or consist of a logical switch that can change state dependent upon the value of a parameter. For instance, the output signal may take one of two states—logic one or logic zero—depending on the parameter.

According to a second aspect the invention provides a monitoring apparatus for use in combination with a remote sensor device of the first aspect of the invention, the monitoring apparatus comprising: a detector responsive to incoming radiation across a range of wavebands that has been reflected from a reflective display of the remote sensing device,
a processor which receives an output signal from the detector and which processes the output signal to identify the presence or absence of a peak or trough within each of a set of defined regions of wavelengths within the band of wavelengths,
and in which the processor is adapted to determine the value of an encoded signal from the sensor device from the pattern of peaks and troughs identified within the regions of the waveband.

The monitoring device may include a source of radiation which emits radiation across the band of wavebands. This may comprise a broadband radiation source that passes through a monochromatic such as a diffraction grating monochromator. Where no source is provided, the monitoring device must rely on light from another source, such as the sun, being reflected from the display of the remote sensor device.

The monitoring device may include one or more lenses that enable the output of the source to be directed to a region in which a sensor device is located. The lens, for example, may focus the radiation into a narrow beam.

The monitoring device may sweep the output of the source across a range of wavelengths across the waveband, for instance from the lowest to the highest wavelength. It may sweep continuously across the range of wavebands, i.e. passing through each wavelength in the band during the sweep. This may be repeated periodically. Where no source is provided, a filter is required before the detector to sweep the sensitivity of the detector across the band of wavelengths. Because the detector does not need to resolve any spatial information from a remote sensor device, a single detector can be used rather than a more expensive detector array as would be needed to read a spatial pattern displayed by a remote sensor device. This reduces cost and may also allow a relatively small display to be monitored over great distances.

The monitoring device may include a memory which stores information relating the identity of a sensor device alongside the digital pattern of peaks or troughs across the waveband. The memory may include a set of patterns which are each unique and correspond to at least one sensor device.

The monitoring device may be adapted to periodically receive and process the output of the detector and identify any modulation of the location of any identified peaks or troughs within the waveband, the processing means of the device being adapted to decode the information encoded in the identified modulation.

The monitoring device may be self contained, and portable. It may include a battery that provides power to a part of the device, and a display upon which information is displayed. Alternatively it may include a memory in which information is stored to be analysed later.

A scanning device may be provided which enables the direction of sensitivity of the detector to be steered spatially across a range of angles. This may be achieved by controlling the direction of any beam emitted by a source of the monitoring device, or where no source is provided enabling directionally selective sensitivity for the detector for incoming radiation.

The applicant has appreciated that it is desirable to obtain spatial information about any sensor devices, and as such as well as the processor identifying the sensor and any encoded sensed values, it may combine this with information about the direction in which the beam is directed at the time that a sensor reflects the beam back to record the location of a sensor.

For example, the beam or detector direction sensitivity may be steered in a raster pattern so that a wide area of space is scanned, allowing multiple sensor devices across that are to be monitored.

The position of the or each detected sensor device, or a subset of the devices, may be stored in a memory repeatedly over a period of time, and the processor may determine the movement of the device or subset of devices over that period of time by processing the stored information.

According to a third aspect the invention provides a method of communication between a remote sensing device and a monitoring device comprising:
Providing a monitoring device having an optical detector, and
Providing a remote sensor device having a reflective display which encodes the identity of the device as a digital pattern of peaks and/or troughs in reflectivity spaced across a waveband; the remote sensor device further including means for modulating the location of the peaks and/or troughs in the waveband as a function of the output of a sensor associated with the device and the method further comprising the steps of:
Illuminating the display of the device with radiation from a source; detecting the radiation reflected back from the display onto the detector of the monitoring device;
analysing the reflected radiation to determine the location of any peaks or troughs in the waveband, and further analysing the identified peaks and/or troughs to determine one or more of the identity of the sensor remote device and the value of the output signal of the sensor device.

The method therefore comprises passively monitoring a sensor device.

The method may comprise deploying a set of sensor devices and analysing radiation reflected from each one. This allows information from a wide area across which the sensor devices are distributed to the collected.

The method may comprise locating the sensor devices in a body of water, in which case the devices may be adapted to float. The devices may sense the depth of water, and the method may therefore comprises determining the depth of the body of water by monitoring the devices.

The method may comprise identifying the spatial location of the or each device, and this may be performed over time to determine the movement of each device. Where they are deployed in water, the method may therefore comprise determining the flow of the body of water by monitoring the movement of the sensor devices.

According to a fourth aspect the invention provides remote monitoring system comprising at least one monitoring device of the second aspect and at least one sensor device of the first aspect.

The remote monitoring system may comprise at least 10, or at least 100, sensor devices.

The remote monitoring system may also include a deployment apparatus for deploying the sensor devices across an area to be monitored. This may, for example, comprise a launcher tube into which one or more sensor devices can be inserted and which fires the sensor devices out of the tube under pressure. The pressure could be applied hydraulically or pneumatically. For instance, a gas could be released into the launcher tube from a gas tank or from initiation of a chemical reaction.

On the other hand it could comprise a slingshot type launcher. In other instances the sensors could be dropped or thrown by hand or using a mechanical device.

One or more of features described above may be combined, individually or in combination, with an apparatus and/or method as described in the following numbered clauses which each describe further aspects of the invention.

Additional Clauses

A remote sensor device comprising:
at least one sensor that produces an output signal indicative of the value of a measurand;
a processing circuit which receives the output signal from the sensor; and
a reflective display that is positioned such that it is visible along a line of sight from a remote location, the reflective display having a pattern of reflectivity across a band of wavelengths, the pattern being digitally encoded with information indicating the identity of the remote sensor device, and further comprising modulating means for modulating the reflectivity of the reflective display across at least a part of the band of wavelengths, the modulation applied by the modulating means being controlled by the processing circuit as a function of the value of the output signal from the sensor.

The modulation may be amplitude modulation of each peak or trough, or time domain modulation in which the wavelength of one or more or all of the peaks is varied, or a combination of both techniques.

A remote sensor according to paragraph 0078 in which the band of wavelengths is divided into a sequence of distinct regions of wavelengths forming the reflective pattern, each region defining a digit in the pattern, the value of each digit being encoded by the reflectivity of the display within that region.

A remote sensor device according to paragraph 0080 in which a digit is encoded within a region as one or more wavelengths in the region at which the display has a high reflectivity (peaks) separated by regions of low reflectivity.

A remote sensor device according to paragraph 0080 or paragraph 0081 in which each digit is encoded within a region as one or more wavelengths at which the display has a relatively low reflectivity (troughs) separated by regions of relatively higher reflectivity.

A remote sensor device according to paragraph 0081 or paragraph 0082 in which the identity is encoded by a combination of the number of regions of peaks and/or troughs with the relative location of the peaks/troughs within the band.

A remote sensor device according to paragraph 0083 in which the encoding pattern comprises a binary digital coding.

A remote sensor device according to any of paragraphs 0078 through 0084 in which the display includes a multiple wavelength filter which determines the encoded pattern of varying reflectivity.

A remote sensor device according to paragraph 0085 in which the filter comprises a transmissive filter layer which is overlaid on a reflective backing layer.

A remote sensor device according to paragraph 0086 in which the filter layer comprises a grating, such as a holographic embossed grating, perhaps etched by a laser.

A remote sensor device according to paragraph 0087 in which the grating comprises a diffractive Bragg grating.

A remote sensor device according to any-of paragraphs 0078 through 0088 in which the band of wavelengths corresponds to wavelengths outside of the range of human eyes, for instance light in the Infra red region.

A remote sensor device according to any of paragraphs 0078 through 0089 when dependent upon paragraph 0079 in which the modulating means encodes the output signal of the sensor on the display by modulating the location of each peak or trough within the band of wavelengths, or modulating the position of one peak relative to another.

A remote sensor device according to paragraph 0090 in which the modulation comprises shifting one or more of the peaks/troughs within a region that represents a digit upwards or downwards slightly in wavelength within that region relative to a nominal unmodulated position, the amount or rate or type of movement being dependent on the value of the output signal from the sensor.

A remote sensor device according to paragraph 0090 or paragraph 0091 when dependent from paragraph 0087 or paragraph 0088 in which the modulation means is adapted to physically deform at least the grating of the display so as to modulate the precise position of the peaks/troughs within the regions representing digits.

A remote sensor device according to paragraph 0092 in which the modulation means comprises a piezo electric element and a voltage source applied across the element, the value of the voltage applied to be element being dependent on the output signal from the sensor, the change in shape of the element stretching or compressing the grating to alter its properties.

A remote sensor device according to any of paragraphs 0078 through 0093 in which the he modulating means in use modulates the location of the digits using a time based modulation scheme, the shifting of the wavelengths varying periodically.

A remote sensor device according to any of paragraphs 0078 through 0094 in which the processing circuit includes a code generator which receives as an input the output signal from the sensor and produces at an output a coded signal that can be used by the modulating means to modulate the reflectivity of the reflective display.

A remote sensor device according to any of paragraphs 0078 through 0095 further including a battery that is water activated located in a housing which includes one or more pores which allow water to enter and wet the battery to activate it.

A remote sensor device according to any of paragraphs 0078 through 0096 which includes a buoyancy device which enables the remote sensor device to float in water, or perhaps to float in the air, the remote sensor device being configured so that when floating it adopts a defined orientation, the reflective display being located on the remote sensor device so that it faces upwards when the device is the right way up.

A remote sensor device according to any of paragraphs 0078 through 0097 that is at least partially of biodegradable material.

A monitoring apparatus for use in combination with a remote sensor device of any one of paragraphs 0078 to 0098, the monitoring apparatus comprising:
a detector responsive to incoming radiation across a range of wavebands that has been reflected from a reflective display of the remote sensing device,
a processor which receives an output signal from the detector and which processes the output signal to identify the presence or absence of a peak or trough within each of a set of defined regions of wavelengths within the band of wavelengths,
And in which the processor is adapted to determine a digital identification for the sensor device from the pattern of peaks and troughs identified within the regions of the waveband.

A monitoring apparatus according to paragraph 0099 which includes a source of radiation which emits radiation across the band of wavebands.

A monitoring apparatus according to paragraph 00100 that further includes one or more lenses that in use enable the output of the source to be directed to a region in which a remote sensor device is located.

A monitoring apparatus according to paragraph 00100 or paragraph 00101 that is arranged in use to sweep the output of the source across a range of wavelengths across the waveband.

A monitoring apparatus according to any one of paragraphs 0099 to 00102 that includes a memory which stores information relating the identity of a sensor device alongside the digital pattern of peaks or troughs across the waveband.

A monitoring apparatus according to paragraph 00103 adapted to periodically receive and process the output of the detector and identify any modulation of the location of any identified peaks or troughs within the waveband, the processing means of the device being adapted to decode the information encoded in the identified modulation.

A monitoring apparatus according to any one of paragraphs 0099 to 00104 which is self contained, and portable.

A monitoring apparatus according to any preceding paragraph when dependent from paragraph 00100 which further includes a scanning device which enables the direction of sensitivity of the detector to be steered spatially across a range of angles.

A monitoring apparatus according to paragraph 00106 that is adapted to obtain spatial information about any sensor devices, and as such as well as the processor identifying the sensor and any encoded sensed values, and to combine this with information about the direction in which the beam is directed at the time that a sensor reflects the beam back to record the location of a sensor.

A method of communication between a remote sensing device and a monitoring device comprising:
Providing a monitoring device having an optical detector, and
Providing a remote sensor device having a reflective display which encodes the identity of the device as a digital pattern of peaks and/or troughs in reflectivity spaced across a waveband; the remote sensor device further including means for modulating the location of the peaks and/or troughs in the waveband as a function of the output of a sensor associated with the device and the method further comprising the steps of:

Illuminating the display of the device with radiation from a source; detecting the radiation reflected back from the display onto the detector of the monitoring device;
analysing the reflected radiation to determine the location of any peaks or troughs in the waveband, and further analysing the identified peaks and/or troughs to determine the identity of the sensor remote device and the value of the output signal of the sensor device.

A method of communication between a remote sensing device and a monitoring device according to paragraph 00108 which further comprises deploying a set of sensor devices and analysing radiation reflected from each one.

A method of communication between a remote sensing device and a monitoring device according to paragraph 00108 or paragraph 00109 that comprises locating the sensor devices in a body of water, the devices being adapted to float and including a sensor that senses the depth of water, the method comprising determining the depth of the body of water by monitoring the devices.

A method of communication between a remote sensing device and a monitoring device according to any one of paragraph 00108 to 00110 which comprises identifying the spatial location of the or each device over time to determine the movement of each device.

A remote monitoring system comprising at least one monitoring device of any one of paragraphs 0099 to 00107 and at least one sensor device of any one of paragraphs 0078 to 0098.

A remote monitoring system according to paragraph 00102 which includes a deployment apparatus for deploying the sensor devices across an area to be monitored.

The invention of this further aspect may include any of the features of the previous aspects of the invention and as set out in the examples that follow.

Other advantages of this invention will become apparent to those skilled in the art from the following detailed description of the preferred embodiments, when read in light of the accompanying drawings.

BRIEF DESCRIPTION OF THE DRAWINGS

FIG. 9 is a table of encoded values for the assemblies of the display of a further exemplary modulation scheme based on four retroreflector assemblies

DETAILED DESCRIPTION OF THE INVENTION

Figure 1:
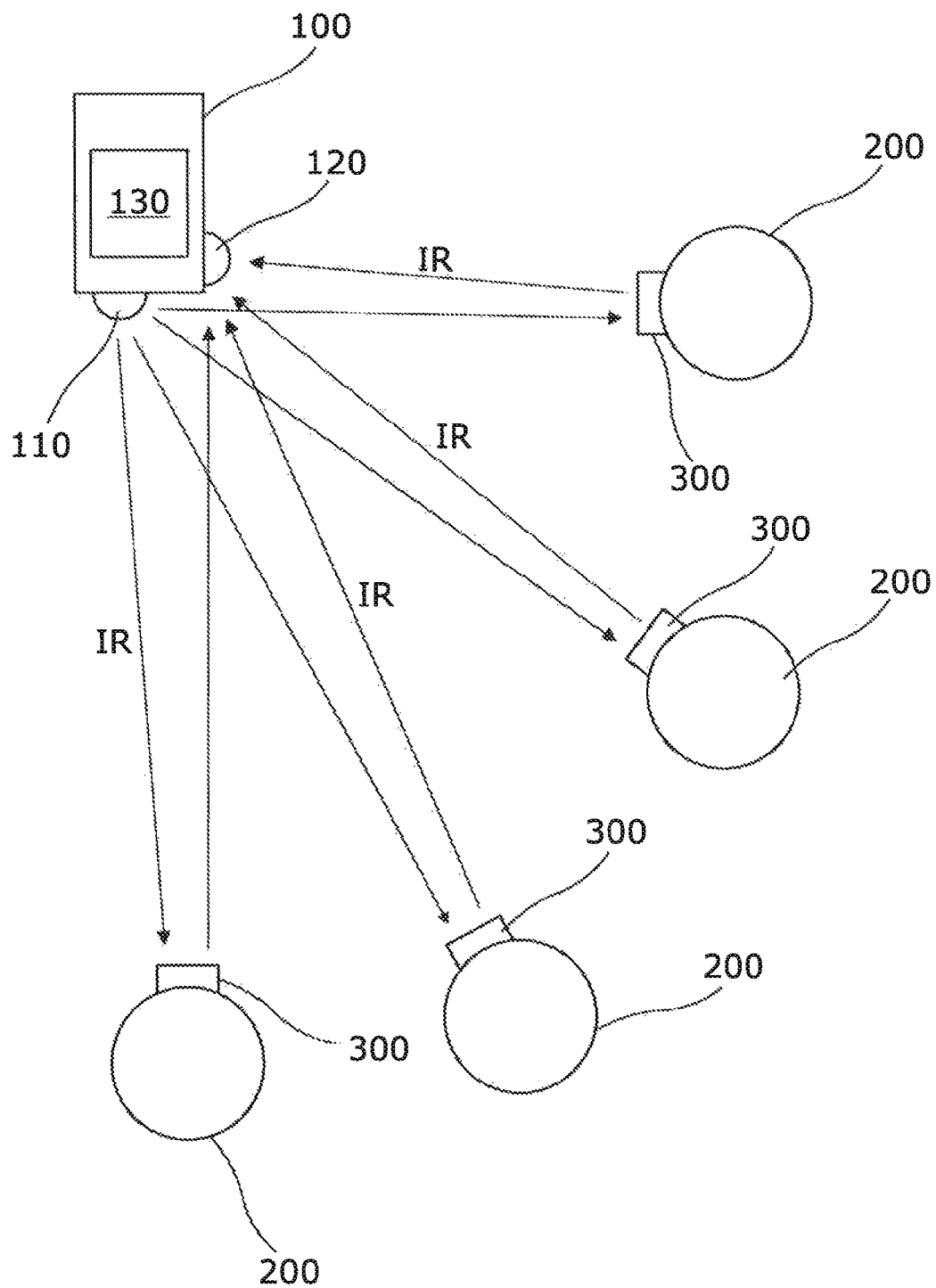
FIG. 1 is an overview of an embodiment of a remote monitoring system.

As shown in FIG. 1, a remote monitoring system comprises a monitoring device 100 and at least one remote sensor device 200. In this example four sensor devices 200 are shown, but there could be as few as one device or many tens of hundreds of sensor devices, or more, depending on what is to be measured or monitored. The sensor devices 200 are passive devices in so far as they do not emit and electromagnetic radiation to encode their identity or to encode any sensor information. Instead each device 200 is fitted with a reflective optical display 300 which encodes information as a pattern of varying reflectivity across a wide band of wavelengths. The displays of the embodiments are strongly retro-reflective, including reflectors that direct light back in the direction from which it originated and sending little light back along other paths.

The monitoring device typically includes a source of radiation 110 which is swept spatially so that at an instant in time it is directed onto a reflective display 300 where it is reflected back onto a detector 120 of the monitoring device. The detector 120 is sensitive to the radiation emitted by the source 110 and hence to the reflected radiation. A processor 130 of the monitoring apparatus 100 interrogates the output of the detector.

Figure 2:
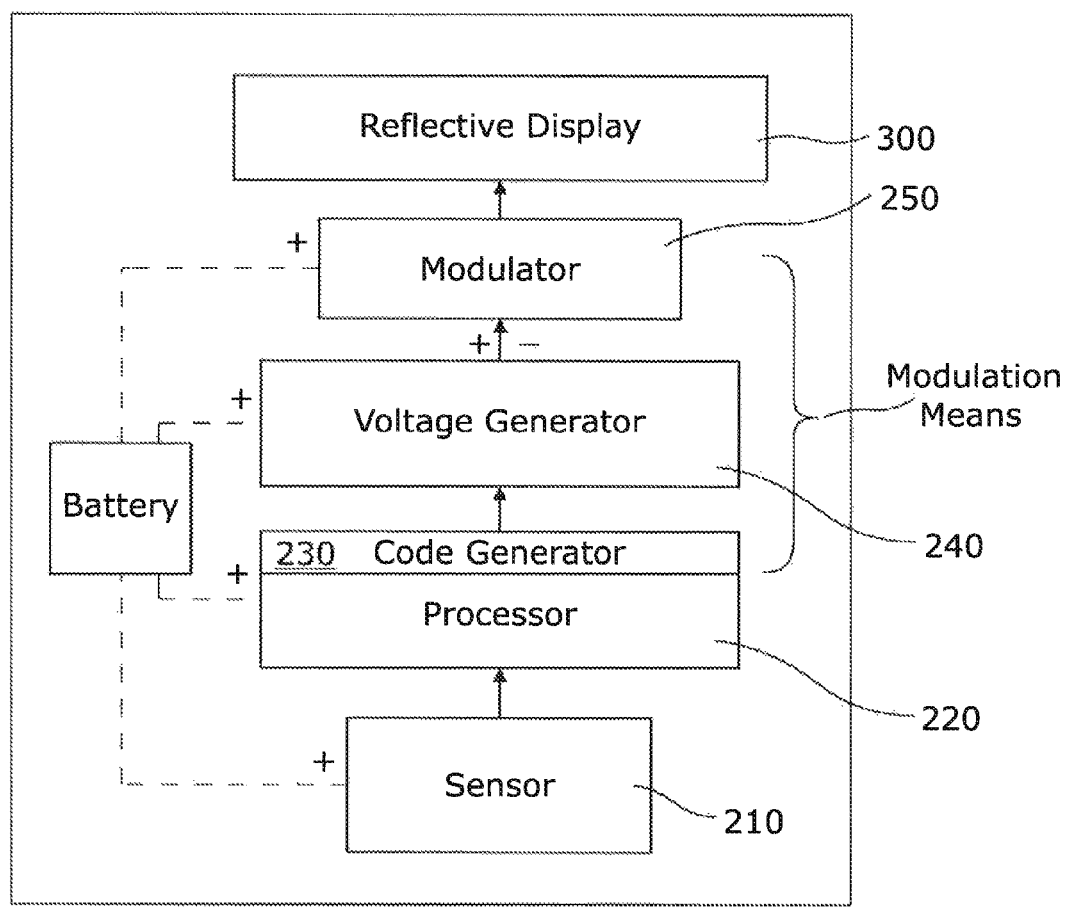
FIG. 2 is a schematic of an exemplary remote sensor device of the system of FIG. 1.

As shown in FIG. 2 a remote sensing device 200 is provided which is hereafter referred to as a sensor pod. It is a self contained device which is capable of monitoring a parameter of interest, and changing its physical properties in such a way that the identity of the sensor pod and also the value of the sensed parameter can be remotely interrogated. The sensor pod is totally passive in so far as it does not emit any significant electromagnetic radiation as the means by which the information can be extracted remotely from the device.

The sensor device 200 comprises a sensor 210, a processor 220 which receives an output signal from the sensor, and a coding circuit 230 that includes a code generator that generates a code responsive to the value of the output signal. The code is passed to a voltage generator 240 that applies a suitable set of control signals to the display 250. As will described later this modulates the overall reflectivity of the display at discrete wavelengths within a define waveband.

Figure 3:
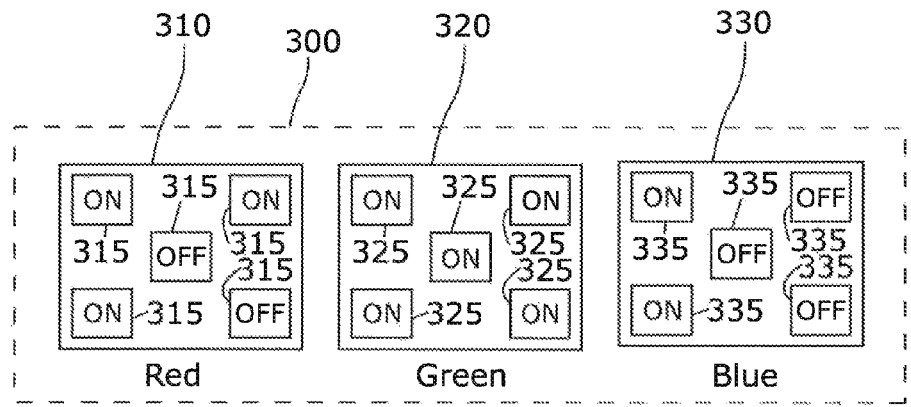
FIG. 3 is a schematic representation of the display of the remote sensor device of FIG. 2.

An example of a suitable display is shown in FIG. 3 of the drawings. The display comprises three retro-reflective reflector assemblies 310,320,330. In a modification there may be only two retro-reflective displays, or four or more. There may be multiple sets of retro-reflective displays, each set defining a retroreflective reflector assembly within the meaning of this application.

Each retro-reflector assembly 310,320,330 comprises five retroreflective devices 315, 325, 335, each of which having a variable retroreflectivity. By this we mean that the fraction of incident radiation that the devices reflect back along the same path that it came from can be varied by the device when in use. This fraction will vary according to the value of one or more control signals applied to each assembly. Each device may be addressed by its own control signal, so for each assembly five control signals may be applied by the voltage generator. This allows the fraction if radiation reflected by each device to be independently controlled.

Figure 5:
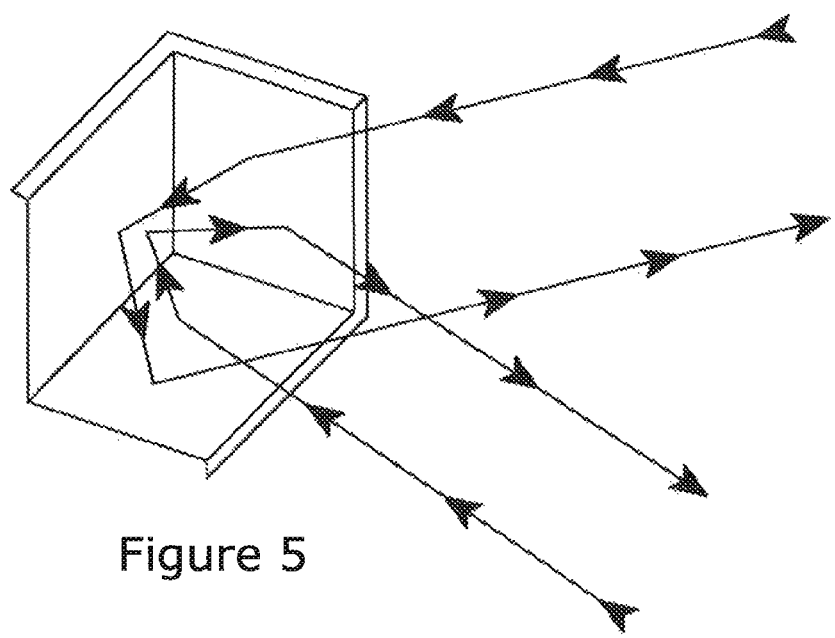
FIG. 5 shows how a corner cube can act as a retroreflector which may be fitted with the MEMs device of FIG. 4
Figure 4:
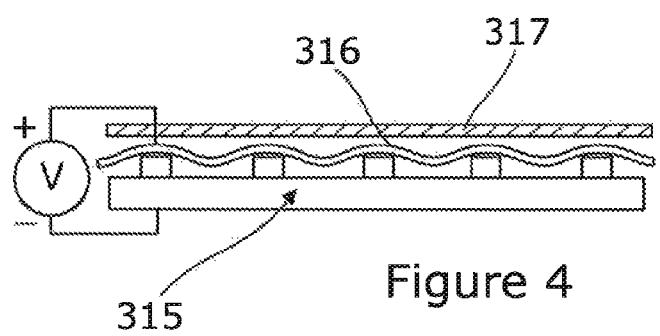
FIG. 4 is a schematic illustration of a MEMS type retroreflector device that may be used in the display of the remote sensor device of FIG. 2.

A suitable retroreflective device 315 is shown in FIG. 4. It comprises a modulating MEMS mirror 316 which forms one of the faces of a retroreflective corner cube. The theory of a corner cube as a retroreflector is well known and is shown in FIG. 5.

MEMS devices can be fabricated entirely through MEMS processing. Alternatively, a commercially-available MEMS scanning micro mirror can be assembled into a corner-cube structure through various proprietary processes. These devices typically operate at frequencies up to a few hundred Hz when operated in "static" (non-resonant) mode.

A more sophisticated variant of this type of device which could be used is the MEMS modulating retroreflector developed by Boston Micromachines Corporation[1] as described in [1] "MEMS Optical Modulator—Technology Overview"; Boston Micromachines Corporation White Paper, 2011. In this case, the micromachined reflective element is a MEMS modulator mirror that is similar to a reflective diffraction grating with controllable groove depth.

The device is mounted as one facet of a hollow corner cube retroreflector and provides far-field intensity modulation of a reflected interrogating beam by switching between an unpowered flat mirror state to a powered diffractive state as shown in FIG. 4. With sufficient separation between the interrogator and the modulating retroreflector, only the $0^{th}$ order of the far-field diffraction pattern is returned to the interrogator. A change in the modulator groove depth (by changing the applied voltage) changes the diffraction efficiency of the $0^{th}$ order, providing a means to modulate the returned intensity of the interrogation source.

Figure 6:
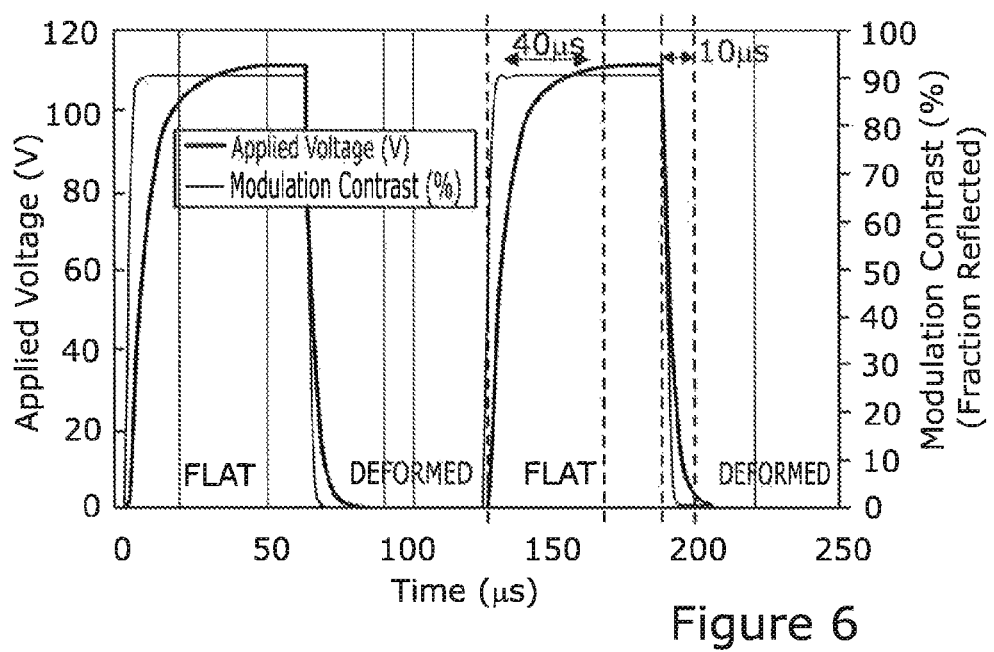
FIG. 6 shows the fraction of radiation reflected by the MEMS device when in a reflective ON state and a non-reflective OFF state.

FIG. 6 shows how the fraction of incident radiation upon the MEMS mirror surface varies depending on the state of the MEMS device. When flat the fraction reflected is around 90 percent, and when deformed to created a diffractive element is around 0 percent.

Each assembly 310, 320, 330 is covered by a different coloured filter 317, 327, 337 or in the case of the Boston type device with a diffraction grating has a tuned, coloured, diffraction grating. The filter ensures that each assembly will preferentially retroreflect light of a different wavelength to the other retroreflector assemblies, light outside of that wavelength ideally being absorbed or scattered or otherwise not retroreflected. The filter may therefore comprise a bandpass filter with the centre of the pass band being equal to the preferentially reflected wavelength.

For convenience of explanation, in this example one assembly is provided with a red filter, another with a blue filter and a final one with a green filter. When white light is incident upon the assembly with the red filer, the fraction of light that is reflected will include only red light, whilst blue and green light will not be reflected back. The assembly therefore appears to be red when viewed under white light.

Of course the filters and reflectors may work with radiation outside of the visible spectrum such as infra red light. Any reference to "colour" should therefore be interpreted as covering a sequence of wavelengths in the visible or beyond the visible range of wavelengths.

The overall reflectivity of each retroreflector assembly is dependent on how many of the reflectors are in the "on" state and reflecting a high fraction and how many are in the "off" state and reflecting a low fraction at a given time. The more that are in the on state the more light is reflected at any given time and the less that are in the on state the less is reflected at any given time, i.e. a smaller fraction of the light is retro-reflected. Assuming each reflector reflects the same amount of light this means that each assembly can encode five distinct values with equal step in the fraction of reflectance between each step.

Figure 7:
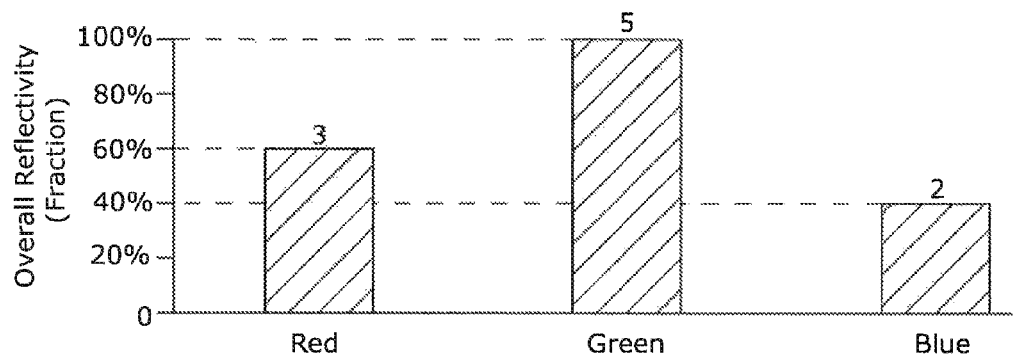
FIG. 7 shows the fractions of an incident white light reflected by the display when the assemblies are in the states shown in FIG. 3.

For the avoidance of doubt, FIG. 3 shows a state in which the control signals cause certain devices to be On, and others off, in a display with three arrays of five reflector devices. FIG. 7 shows the encoded relative fractions of red, blue and green reflected by the display when in the state shown in FIG. 4. It can clearly be seen that the fraction reflected by each of the three assemblies is different, with more green than any other wavelength because more of the green devices are set to the ON state. FIG. 7 is produced assuming that each reflective device is identical apart from the colour of the filter used, and that white light is incident upon the display with equal amounts of red, blue and green light.

The sensor pod 200 therefore has a display with a retro-reflective surface which is wavelength-selective. This means that when illuminated by broadband electromagnetic radiation (preferably in the infra-red spectrum despite coloured visible light being described for the example for ease of understanding), the reflective surface selectively absorbs or scatters certain wavelengths and retro-reflects other preferred wavelengths in varying fractions. The reflective surface is preferably retro-reflective to improve the level of any reflected signal back towards a source of radiation.

It will be understood by the skilled reader that the overall "colour" of the display can be controlled by varying the fraction of each preferential wavelength retroreflected by each assembly. This can be used by the display to encode information onto incident radiation that is reflected from the display.

Having provided the device with a set of three retroreflectors assemblies, each preferentially reflecting radiation of a different "colour" and each being controllable in the fraction of incident radiation that they retro-reflect, the sensor is configured to encode information onto the display using the control signals from the modulating device.

Various encoding schemes can be used and there follows several suitable schemes:

Example Encoding Scheme 1

Each remote sensor device has three retroreflector elements, one each tuned to red, green or blue wavelengths. The wavelength tuning will be done using techniques such as coloured filters which are substantially independent of the incident light angle. The reflectivity can be intensity-modulated (e.g. by MEMS micro-mirrors) by application of appropriate control signals. Each reflector can have, for example, 5 retroreflecting MEMS devices which give 5 levels of reflectivity depending on how many of the mirrors are active at any one time. The mirrors are driven by a simple microcontroller in the sensor pod forming a modulation means.

The scene is illuminated with a broadband light source, and viewed with an imaging multi-wavelength camera. In the visible range this would be a colour camera, with pixels tuned to red, green and blue wavelengths.

The overall amount of each colour, Red/Green/Blue, that is reflected, is set by the number of devices that is switched on in each assembly, i.e. by controlling the fraction of light that is retroreflected by each assembly. If more of the devices of the blue assembly are ON, and less of the other devices are ON, the overall colour will appear more Blue compared with another sensor pod with less of the blue devices on, or in which more of the other devices are On.

The modulation means may provide control signals to the devices which are dependent on the value of an identity code assigned to the remote sensor device, or on the value of the measurand. This may be a unique identity code.

Effectively each sensor device will appear to the camera as a different shade of colour that is dependent on the code allocated to the sensor device, thereby enabling the individual sensor pods to be identified and tracked provided that the code used is known by the detector.

As the relative proportions of the three colours reflected (as seen by the camera) will depend on factors such as the illumination spectral distribution, a reference function is provided. The control signals sent to the devices of each sensor device are periodically changed to cause each retroreflector assembly to switch all of its mirrors to maximum reflectivity, i.e. all devices On: when detected by the camera, this will give a reference for the subsequent reduced level which encodes the sensor device ID or measurand. The relative proportions of light reflected back in the reference and encoded states provides the encoded information.

Figure 8:
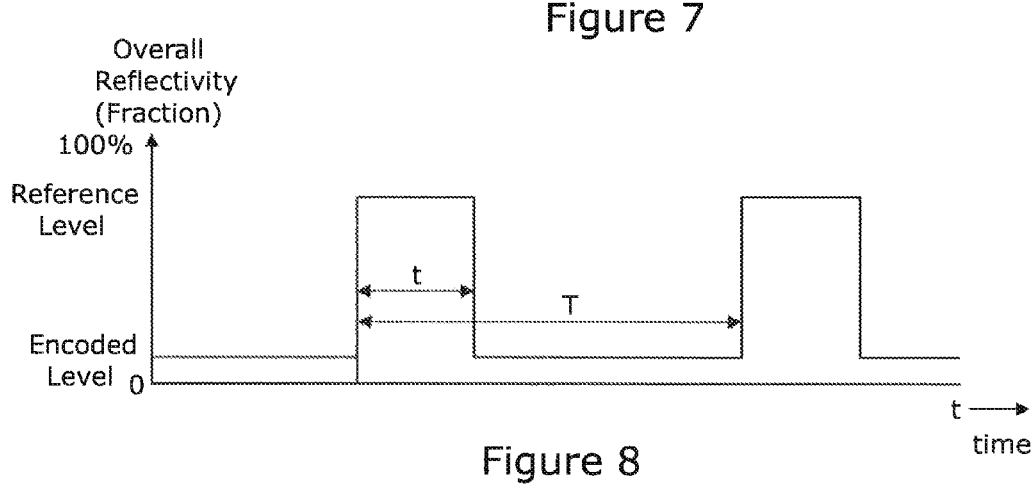
FIG. 8 shows the Pulse width modulation of the fractions of reflected radiation in an exemplary modulation scheme

FIG. 8 shows the periodic changing from encoded colour state to the reference state and back with a time period T. The time spent in the reference state is time=t.

Figure 10:
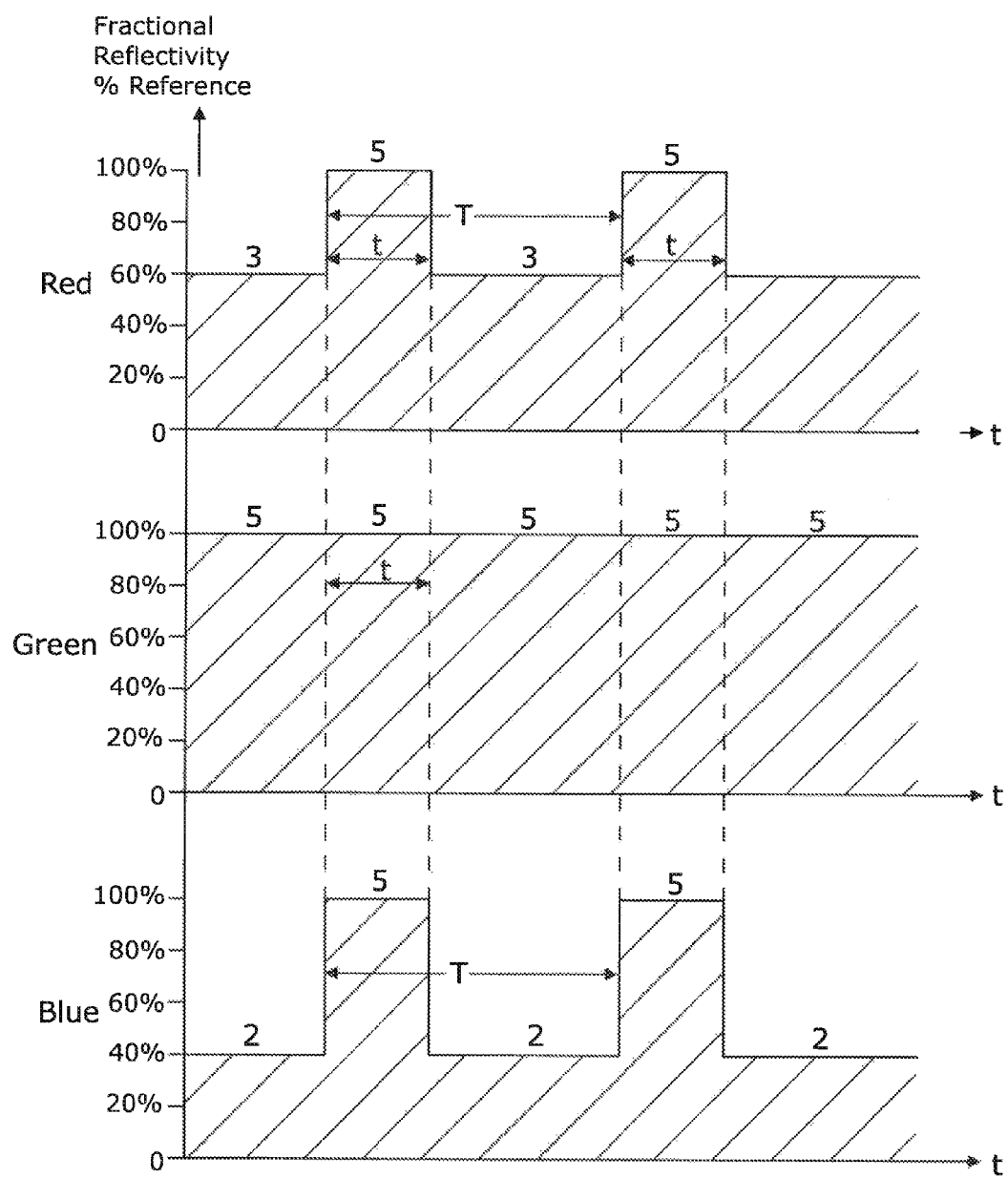
FIG. 10 is a plot of the reflected fractions of radiation from each of three assemblies when modulated using an exemplary modulation scheme of the invention that includes periods where the assemblies are placed in a reference state.

Furthermore, the period or mark-space ratio of this reflectivity modulation may be used to encode additional information. For example, if the colour of the display when not in the reference state encodes the identity of the sensor device, the mark space ratio may encode the output signal from the sensor, e.g. to encode the measurand (such as depth of a body of water in which the sensor is floating). With reference to FIG. 8, the time t within each period T is modulated to encode this extra information. This is shown in FIG. 10 of the drawings which clearly shows how the fraction of reflected radiation from each assembly, red/green/blue, is varied over time.

The modulation means may therefore apply a PWM technique to vary the timing of switching between the encoded and reference states and vice versa, giving an additional encoding dimension to the device. Since the identity of the remote sensor device does not change, this will comprise periodic switching between at a set PWM marks space ratio between only two states, one with Red, Green and Blue values (in this example) encoding the identity and the other being a reference state of fixed value, i.e., in which each fraction is fixed.

The frame rate of the camera must be fast enough to be able to track the movement of the pods to the required spatial resolution and to demodulate the PWM encoding.

The skilled person will of course appreciated that the encoding could be reversed so that the depth information is encoded by the "colour" and the identity of the sensor pod by the mark-space ratio modulation.

Also, it will be understood that this scheme can be applied to displays with only two retroreflecting assemblies or three or more, and that each may have as few as two or as many as three or four or more individually controllable retroreflector devices.

Example Encoding Scheme 2

As with the first encoding scheme example, each remote sensor device has three retroreflectors tuned to red, green and blue wavelengths through the use of (e.g.) colour filters. The reflectivity is modulated by (e.g.) MEMS micro-mirrors. Each reflector can have, for example, 5 MEMS devices which give 5 levels of reflectivity dependent on how many of the mirrors are active at any one time.

The mirrors are driven by a simple microcontroller in the remote sensor device.

As an example, if each reflector has 5 reflectance levels, this means that there are $5^3$ (125) unique combinations.

The modulation means generates control signals for the retroreflective assemblies which encode the measurand (such as depth) by selecting one of the 125 unique values, each value being assigned to a value of the output signal. Thus, the overall colour of the display will uniquely correspond to a respective value of the measurand at any given time.

The scene is illuminated with a broadband light source, and viewed with an imaging multi-wavelength camera. In the visible range this would be a colour camera, with pixels tuned to red, green and blue wavelengths. Effectively, each remote sensor device will change colour (as seen by the camera) depending on the water depth. By knowing the code used to assign a colour to a value of the output signal (the measurand) the value of the measurand can be determined remotely.

As the relative proportions of the three colours reflected (as seen by the camera) will depend on factors such as the illumination spectral distribution, a reference function is provided. Each remote sensor device may periodically switch all its mirrors to maximum reflectivity: when detected by the camera, this will give a reference for the subsequent reduced level which encodes the depth information.

In this simplified scheme there is no PWM and no reference state used.

Again, the scheme can be used with displays with two or more retroreflector assemblies, each of two or more devices.

Encoding Example 3

Note that, for ease of description, this again refers to wavelengths in the visible range, but is equally applicable to the infrared range for the actual device using appropriate wavelength bands.

In this example, each remote sensor device has four retroreflector systems, one each tuned to red, yellow, green and blue wavelengths. The wavelength tuning will be done using techniques (such as coloured filters) which are substantially independent of the incident light angle. The reflectivity can be intensity-modulated by (e.g.) MEMS micro mirrors. Each reflector can have, for example, 4 MEMS devices which give 4 levels of reflectivity depending on how many of the mirrors are active at any one time.

The mirrors are driven by a simple microcontroller.

As an example, if each set of retroreflectors has 4 reflectance levels, this means that there are $4^4$ (256) unique combinations to identify the pods and encode data.

The scene is illuminated with a broadband light source, and viewed with an imaging multi-wavelength camera. In the visible range this would be a colour camera, with pixels tuned to red, yellow, green and blue wavelengths.

Effectively, each remote sensor device will be a different shade of colour as seen by the camera, thereby enabling the individual device to be identified and tracked and the encoded information to be decoded.

As the relative proportions of the four colours reflected (as seen by the camera) will depend on factors such as the illumination spectral distribution, a reference function is provided. Each remote sensor device will periodically switch all its mirrors to maximum reflectivity: when detected by the camera, this will give a reference for the subsequent reduced level which encodes the pod identification and depth information. Each remote sensor device is physically identical, and is programmed with its ID in firmware after manufacture.

As there are effectively 254 codes available (ignoring the "all on" reference and "all off" states), there is plenty of capability to encode the measurand to a high resolution (which requires 100 states for 1 percent resolution) plus the individual remote device identifications (which might require another 100 states to identity 100 devices uniquely).

In use the modulation means will cause each remote sensor device to alternately display its ID and the measurand (for example depth) information, interposed with appropriate reference states if provided. The sensor device therefore modulates the fractions with two different pieces of information, switching back and forth between the two.

FIG. 9 shows an example of how the data might be encoded. In this example, the "Red" channel value is used to determine whether the encoded information is the depth or the identity code. "R" values of 1 or 2 denote depth information, values of 3 or 4 denote an identity code. Reference states "2444" (for depth) or "4444" (for ID) are used before each data (encoded) state.

The Monitoring Device

The sensor pods 200 are interrogated by a monitoring device 100 which shines light onto the sensor pod 200 across the waveband and measures the reflectivity from one end of the designed wavelength range to the other. This could be from the shortest wavelength to the longest, or in the reverse direction.

Figure 11:
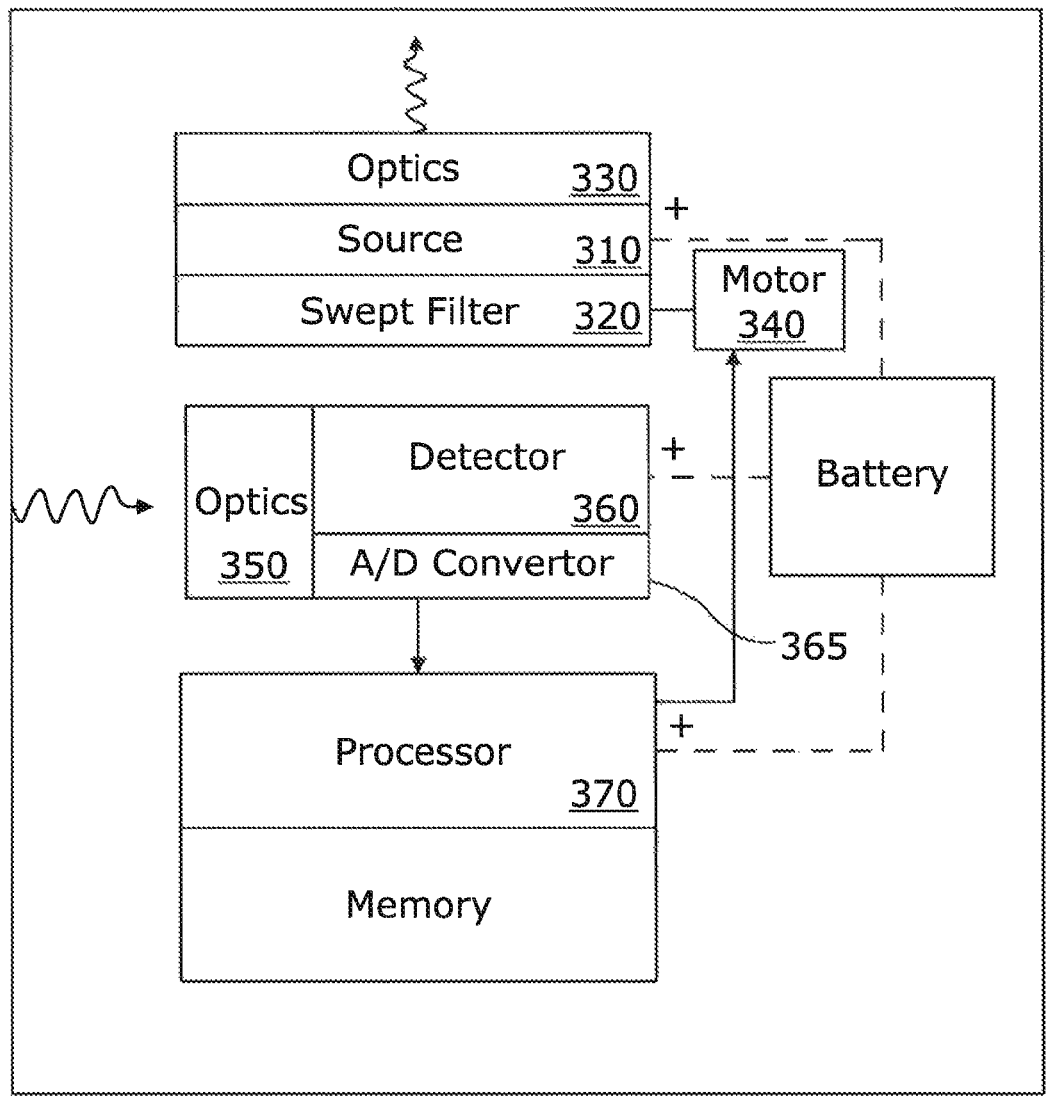
FIG. 11 is a schematic representation of a monitoring device that can be used to monitor radiation reflected from a remote sensor device.

The monitoring device of this embodiment is shown schematically in FIG. 11 and includes a broadband light source 310 in the form of a tungsten filament lamp. The source emits lights that passes through a diffraction grating monochromator 320 and then through projection optics 330 to project a beam of light onto a sensor pod 200. The monochromator is driven by a motor 340 controlled by a processor 370, which thus controls the wavelength of light emitted by the monochromator in order to scan across the desired wavelength range.

A further set of imaging optics 350 collects light reflected from the sensor pod and images it onto a photodetector 360, the signal from which is amplified before passing through an Analogue-to-Digital Converter 365. The digital output from this is passed to the same processor 370 that controls the monochromator, thus allowing the received signal level reflected from the sensor pod to be correlated with the scanned wavelength. It will be obvious to anyone skilled in the art that there are many other ways of achieving a similar wavelength scanning function.

Scanning the wavelengths rather than receiving continuously at discrete fixed wavelengths has a number of advantages:

It is likely that the actual reflected wavelengths, although designed to be nominally at certain values, will vary due to manufacturing tolerances, temperature or the angle of incidence of the light beam on the sensor surface. By choosing an appropriate binary bit sequence according to well-known techniques, each sequence is unique and can always be identified even if the absolute wavelengths shift.

The measurand can be encoded within the bit sequence by wavelength shifting the whole code. Rather than modulating individual bits of the sequence, the whole code is periodically shifted up or down slightly in wavelength. This modulation of the code can be detected by the scanning device and used to infer the measurand. Below is a description of how this would work:

The monitoring device identifies the fraction of each of the three (or four or more) preferentially reflected wavelengths (such as red/green/blue) in the scanned waveband. The processor then looks up the fractions against stored identity information held in a memory. These fractions will define a "colour" for the display.

The interpretation of the colour will depend on the modulation scheme used. For instance the colour may encode information about the identity of the device.

In addition, the precise location or any time dependent modulation of the colour is identified by the processor. This modulation is then demodulate by the processor to determine the value of the measurand encoded by the sensor pod.

In an alternative, the monitoring device could consist of a broadband illumination source and a video camera responsive to the multiple wavelengths that are preferentially reflected by the remote sensor devices. The images captured by the camera may then be processed to determine the pattern or "colour" of any displays viewed by the camera. If the display is far enough away, and depending on the camera resolution, the light from all three or four retroreflector assemblies of the display will appear as one spot with a colour made up from the combination of fractions. This spot may appear to flash where a data/encoded signal is alternated with a reference.

Spatial Imaging

If more than one sensor pod 200 is deployed, as shown in the example of FIG. 1, the wavelength scanning device preferably also knows the positions of the sensor pods, in other words, an imaging function is needed. This can be achieved, for example, by also scanning the area containing the pods spatially, for example in a raster pattern, to enable the signals from spatially separated sensor pods to be distinguished. This type of device is well known and is sometimes referred to as a "multi-spectral imager" or "multi-spectral scanner".

This spatial scanning can be achieved by, for example a moving mirror scanner as is well known for laser rangefinders and laser image projectors.

Those skilled in the art will know there are many other ways of achieving a similar function.

Example Sensor Forms

Figure 12:
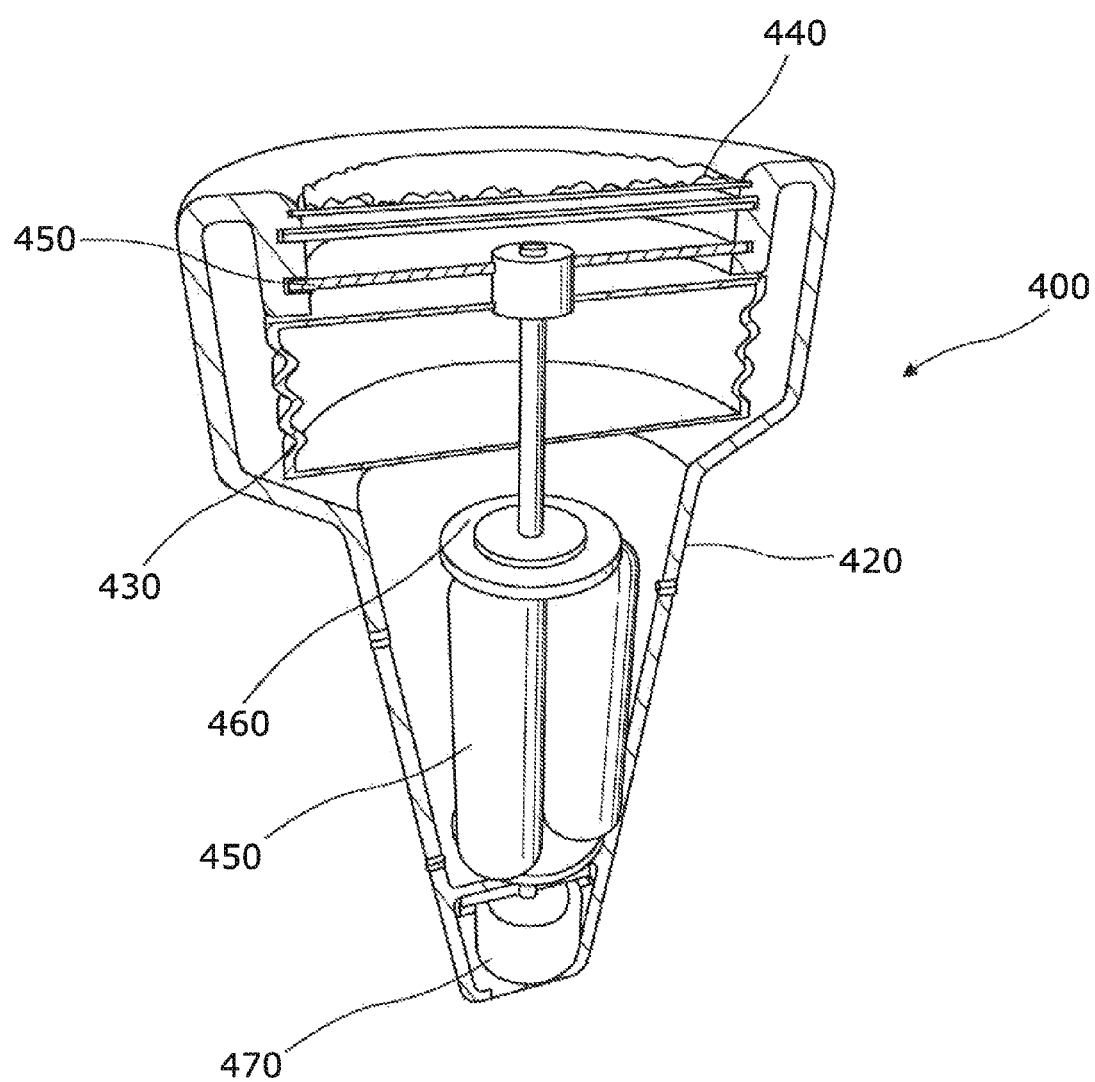
FIG. 12 is an illustration of the form of a first exemplary embodiment of a remote sensor device for use in water or on land.

FIG. 12 is an illustration of a possible form of sensor pod 400 for use in water. The sensor pod 400, when fitted with an ultrasonic detector 410 or similar, could be used to measure the depth of a body of water in which the sensor has been located. Monitoring the sensor would allow depth measurements to be obtained remotely and also by monitoring the position of the sensor device the flow of the water can be monitored. This may have application in the measurement of the depth of a river or reservoir, or the monitoring of tides or extreme events.

The sensor pod 400 comprises a housing 420 having an enlarged upper portion that contains a buoyancy aid 430. This may comprise a bag full of air. The upper surface of the enlarged upper portion is provided on an outer surface with a single horizontal retro reflective surface 440 if interrogation from an airplane or such like is intended, or alternatively a number of reflectors disposed in a vertical plane (for example, around the circumference of a "drum" mounted on top of the sensor) if interrogation from a land-based monitoring apparatus is envisaged. Again the reflectors will be wavelength selective and have capability of modulation.

The housing accommodates a set of batteries 450 above an ultrasonic depth sensor 410, The batteries are relatively heavy and are located in an elongated lower portion of the housing. This helps ensure the pod floats in the correct orientation and provides some stability.

Above the buoyancy aid 430, in a sealed space below the reflective display 440, are the processing circuit and modulator 450. They receive power and signals from the batteries and sensor along a conductive spine 460.

The sensor device may be ruggedized so that it can be thrown, fired, or dropped into position in the water using a hand powered, gas powered or spring powered launcher. A simple method of deployment would be to drop the sensor devices from an airplane which is fitted with a suitable monitoring device.

Figure 13:
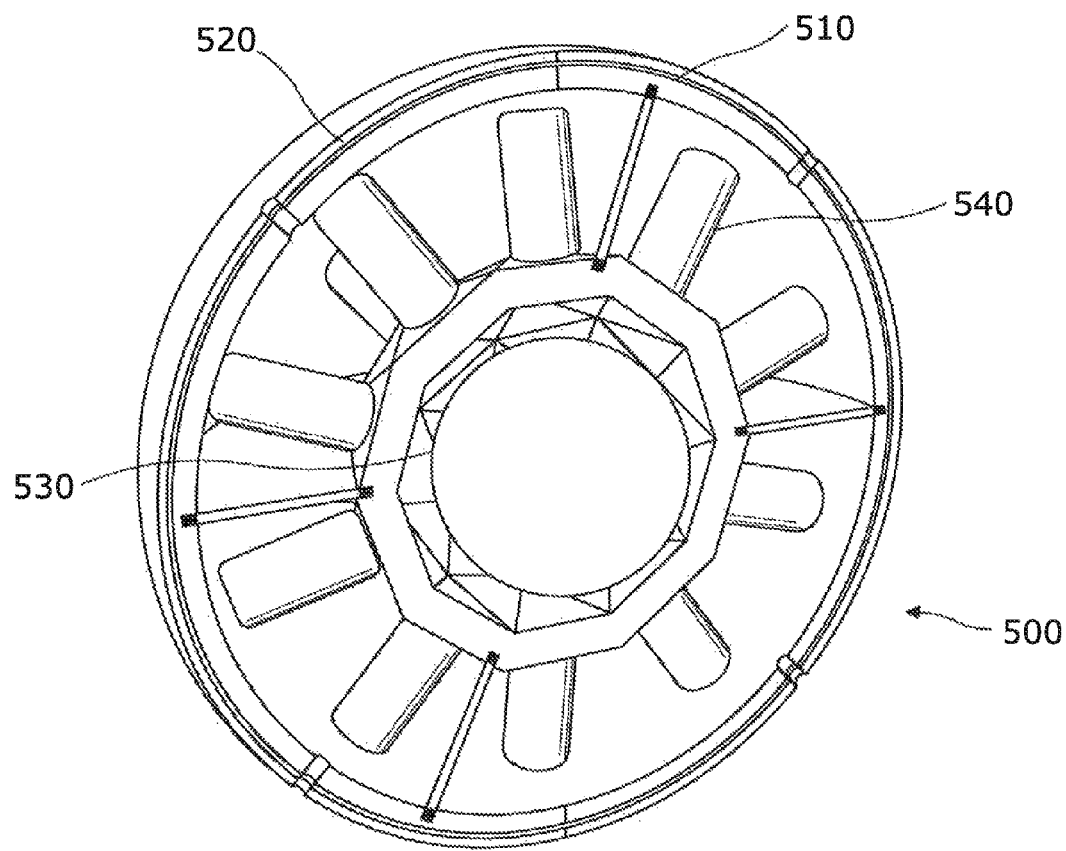
FIG. 13 is an illustration of the form of a second exemplary embodiment of a remote sensor device for use in water or on land.

FIG. 13 is a cross sectional view of an alternative form of sensor pod 500 that may also be used in water or on land or in the air (if suitably suspended or given sufficient buoyancy).

In this embodiment, the housing 510 is spherical and the weight of the batteries 520 and other components is distributed within the housing such that it will rest in any orientation without any sense of self-righting unlike the embodiment of FIG. 12. The entire outer surface of the housing 510 or a major part of it, forms a reflective display 520, and as such it is visible from any orientation. A centrally located buoyancy aid 530 is provided, and the batteries 540 are located around this. Modulation of the reflective display is achieved by changing the size of the housing, perhaps by inflating the housing or by making the housing vibrate. An inner shell of piezoelectric polymer could be used to expand and contract the sphere. The control signals from the modulation means will control the size of the sphere in turn modulating the retroreflective assemblies.

The housing 510 may be vibrated in a burst at a first high frequency, for example in the ultrasonic range of frequencies, after which the sensor switches to a listening mode to sense depth, turning the housing into an ultrasonic sensor. It may be vibrated at a second lower frequency which stretches and compresses the reflective display slightly to modulate the reflectivity of the reflective display. This eliminates the need for a separate sensor and modulator.

Exemplary Uses

The applicant envisages a number of uses of the present invention, the following being a non-exhaustive list of possible uses.

The sensor pods can be deployed in water, to monitor the depth of the water. This may be of use during flooding, enabling the extent of the flooding and the depth to be measured. If the water is considered too deep to ford then the appropriate measures can be taken. This system may also be of interest to those engaged in the off road driving leisure market, where it is essential to check the depth of obstacles such as puddles and rivers before attempting to drive through the water.

The sensor pods may be fitted with gas or pollution sensors and can be deployed remotely in the case of a gas leak or oil spill at sea or in river. The sensor could measure temperature, hydrocarbon levels, dissolved oxygen, toxic chemicals, water depth, flow rate. This would enable the extent or spread of the oil of gas leak to be monitored. The risk of an explosion would be very low because the sensor pods are interrogated remotely.

The sensor pods could be used in a similar way to monitor pollution caused by spills of sewage.

Figure 14:
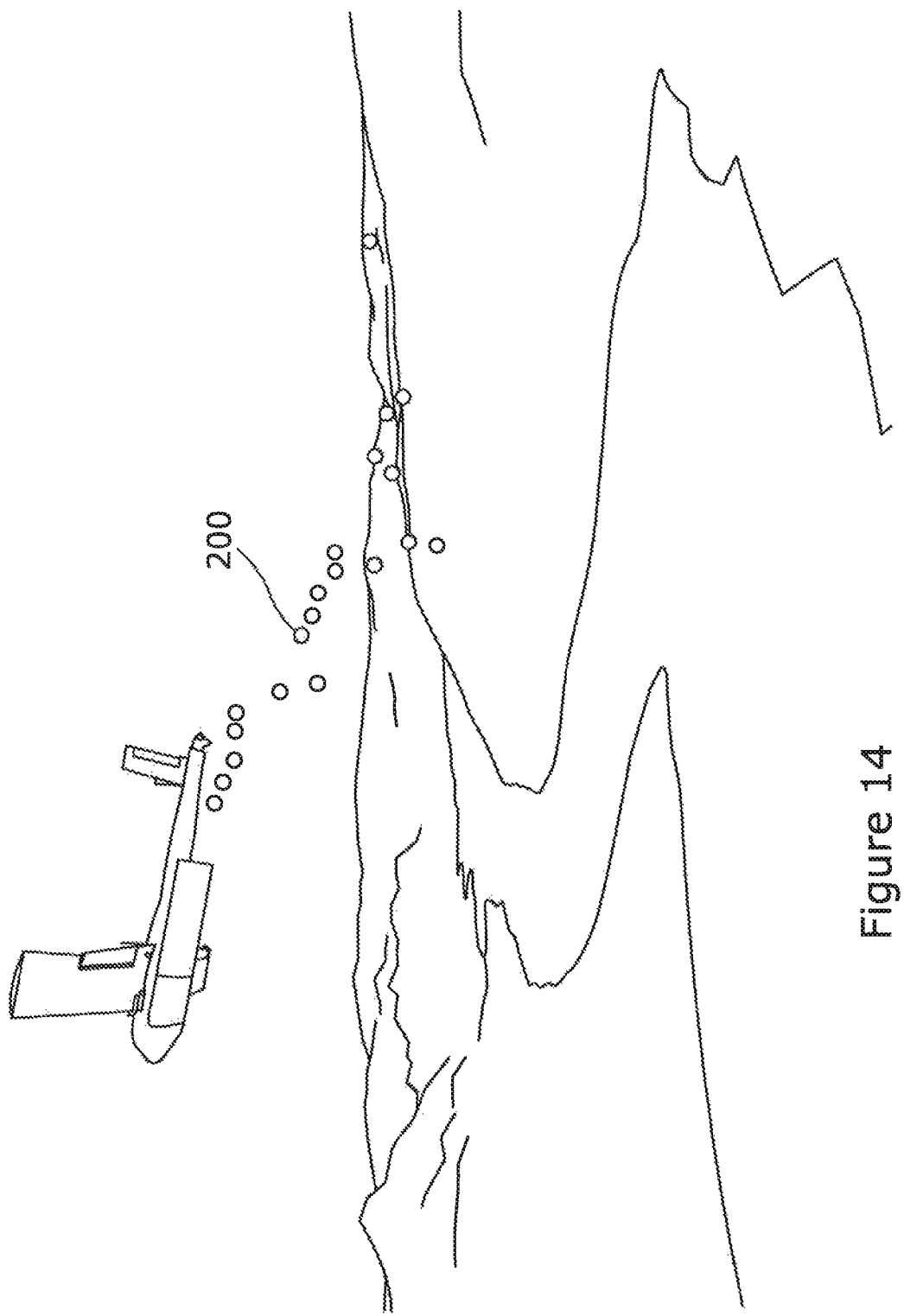
FIG. 14 illustrates deployment of a set of sensor pods from the air.
Figure 15:
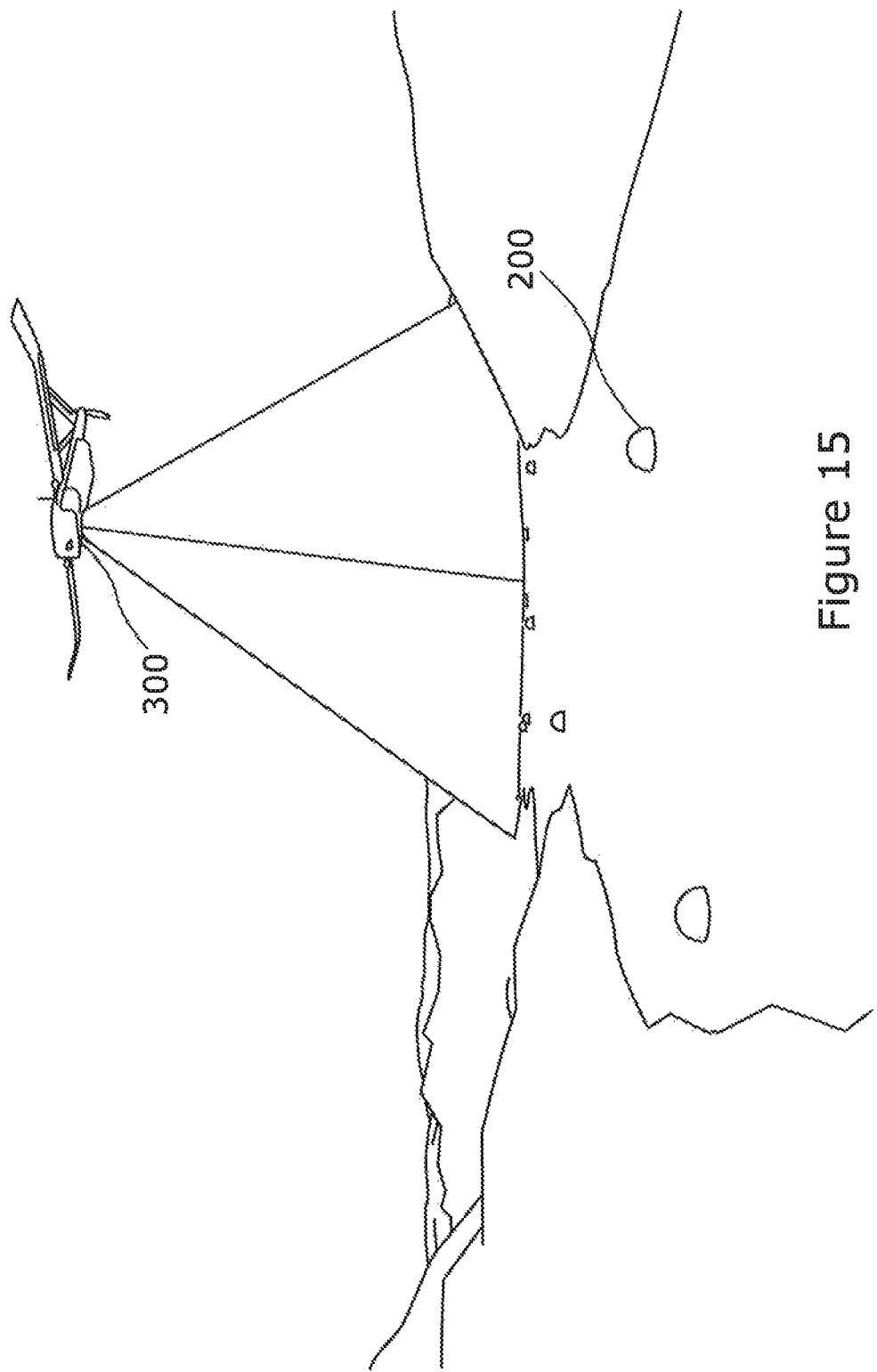
FIG. 15 illustrates the monitoring of the deployed sensor pods from the air.

The sensors could be monitored from a land based monitoring device or a water based, airborne or even a space based monitoring device. FIG. 14 shows the devices being deployed from an airborne vehicle, and FIG. 15 shows how the same vehicle can then fly overhead to monitor the devices.

Modifications

Although the use of retroreflector devices based on MEMS mirrors has been described, other types of retroreflector devices are feasible within the scope of the present invention.

Electrically-activated shutter mechanisms, placed in front either of a retroreflecting corner cube assembly or a cat's-eye lens assembly, have also been demonstrated in free-space optical data transmission systems. One such approach involves the use of a ferroelectric liquid crystal-based modulator at the aperture of a retroreflecting corner cube assembly. Liquid crystal switching times are generally limited to data rates of 100 kbps or less, meaning that only relatively low data rates are possible using this technique.

More recently, the Novel Devices Laboratory at the University of Cincinnati has developed a shutter mechanism based on a switchable electrowetting fluid which, when placed in front of a corner cube assembly, switches from retroreflecting to non-retroreflecting mode. Switching rates are currently of the order of 100s of Hz, with a maximum rates of 100 kHz conjectured.

An advantage of this electrowetting retroreflector technology is that it can be formed into strips or sheets to give the potential for large-area retroreflection, similar to the non-active retroreflective materials used in various applications today. Samples of this material are available from the University of Cincinnati.

Semiconductor-based modulators can also be used as one of the faces of a corner cube, or as a shutter mechanism in front of a retroreflecting structure (either a corner cube retroreflector or a cat's-eye lens). For example, the US Naval Research Laboratory has investigated the use of GaAs and InGaAs multiple quantum well (MQW) semiconductor switching modulators. Semiconductor MQW technology is the basis for commercially available laser diodes, and when used as a shutter, offers the possibility of high switching speeds (tens to hundreds of Mbps), and potentially reduced susceptibility to angular misalignment.

Another technique which has been demonstrated uses an array of cat's eye retro-reflectors modulated through the use of a "smart" polymer dispersed liquid crystal layer. Switching of the image pattern of the retro-reflected light enables a dynamic image to be obtained which can be used, for example, as a high-security ID system.

Further alternatives based on wavelength modulation.

Figure 16:
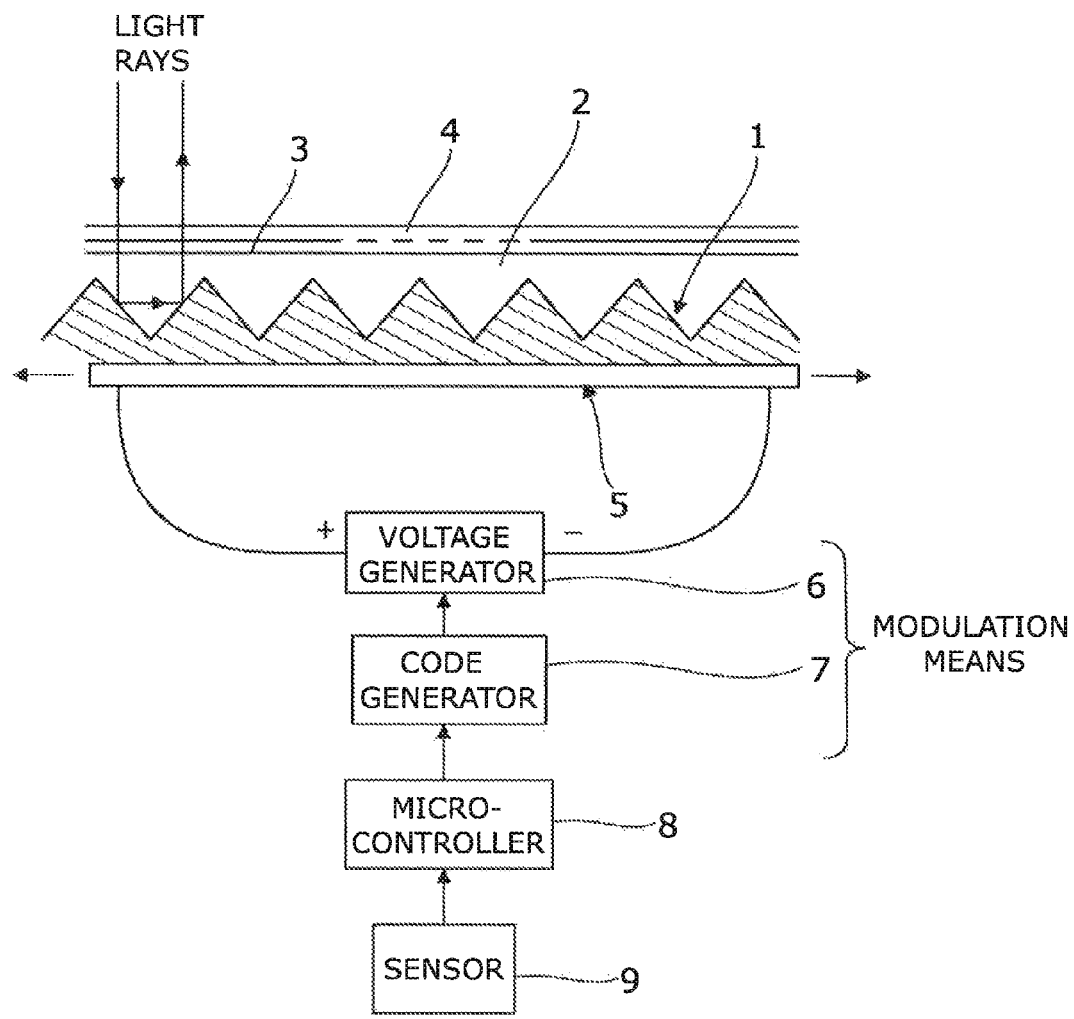
FIG. 16 is a cross section through an alternative reflective display of the remote sensor device of FIG. 2.

The sensor pod 200 may be provided with a display comprising a reflective surface 1 (shown in FIG. 16) which is wavelength-selective. This means that when illuminated by broadband electromagnetic radiation (preferably in the infra-red spectrum), the reflective surface selectively absorbs certain wavelengths and reflects others. The reflective surface is preferably retro-reflective to improve the level of any reflected signal.

The sensor identification data and the measurand may be encoded into this selective reflectivity as follows:

A number of discrete wavelengths are chosen spanning a band of wavelengths that fall within the wavelength range of the monitoring device. For example, if the monitoring device scans from 800-900 nm (a 100 nm range), there could be 11 discrete wavelengths at 10 nm spacing between 800-900 nm. It is important to make sure that the discrete wavelengths are at an appropriate spacing able to be distinguished by the scanning device.

Each of these wavelengths is assigned a binary digit, thus the sequence of wavelengths will make up a binary word with, in the example above, 11 digits.

These binary digits can be used to encode a unique identifier for each sensor pod, by arranging for the sensor surface to selectively absorb or reflect at only some of these wavelengths.

Figure 17:
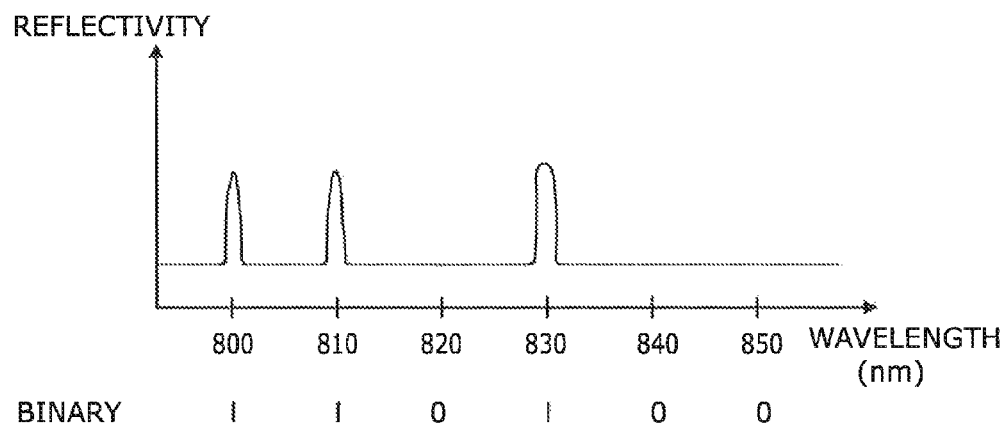
FIGS. 17 and 18 illustrate the binary encoding of the identities of two sensor devices within the patterns of reflectively of their respective reflective displays
Figure 18:
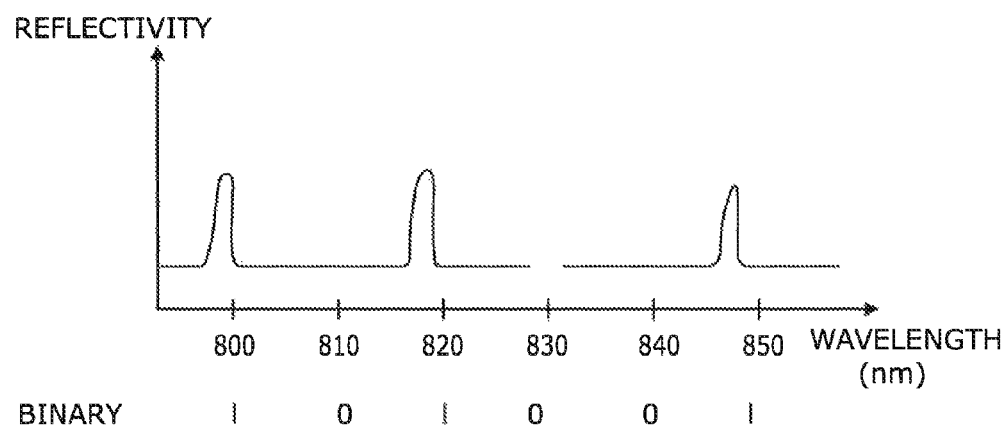

FIGS. 17 and 18 show examples of how a binary word can be encoded into the wavelength spectra of two different sensor devices. FIG. 17 encodes the binary sequence 110100 by choosing a combination of 6 discrete wavelengths, three of which include peaks of high reflectivity and three of which do not. FIG. 18 encodes the binary sequence 101001 by a different combination of the same 6 wavelengths, with three peaks located at different ones of the wavelengths.

Note that the selective reflectivity could also be arranged so that there is a drop in reflectivity at each chosen wavelength rather than an increase.

The display 300 of the sensor device 200 in this alternative includes a wavelength selective filter 3 that preferably a diffractive filter. Such filters are well known to experts in optical elements. Each individual sensor pod will require a different filter with different wavelength combinations to uniquely encode the identity of the pod 200. Preferably, for ease of manufacture, these diffractive filters can be manufactured by laser interference (holography) according to well-known processes. This gives the opportunity to easily write different filter characteristics to each sensor pod (by programming the laser pattern differently) whilst retaining the possibility of mass production, as the pods can be manufactured with "blank" filters which can then be individually laser written to give the desired properties.

Each individual sensor pod 200 in this embodiment will have its reflective display 300 equipped with a different diffractive element or set of elements thus giving a unique code to each pod. To modulate the code in order to transmit the measurand data, the whole diffraction element is stretched or compressed by, in this embodiment, the piezo actuator. This will change the diffraction element grating spacing and hence shift the reflected wavelengths of the reflected signals.

This stretching will be easier if the diffractive and retro-reflective elements are made on a compliant material such as a polymer.

The reflective display 300 comprises a retroreflective backing 310 that is mounted onto the piezo stretcher device 250.

The wavelength selective reflecting surface is preferably a retro-reflective surface 1. The reflective display is preferably formed of a number of small "tiles" in a similar way to a "mirror ball". Each of these tiles will be retro-reflective, wavelength selective and have the capability of modulation.

The display includes a diffractive optical wavelength filter 3 which contains the sensor's unique wavelength code. The space between the filter and the retro-reflector backing is filled with a transparent material 2.

Preferably the transparent material 2 is chosen to a) have an appropriate optical refractive index to reduce internal reflections between itself and the filter 3, and b) to have appropriate mechanical properties to transmit the stretching motion of the piezo device to the filter 3.

The outer surface of the filter 3 is preferably protected with a visible light blocking filter 4 which minimises visibility of the device to humans while passing the infra-red radiation from the scanning system. It also provides mechanical protection to the filter.

The piezo stretcher 5 is driven by the voltage generator 240 which produces sufficient voltage to expand the piezo device (and hence the whole optical assembly) sufficiently to encode the modulation signal as previously described.

The voltage generator is in turn driven by a modulation code generator which creates the PWM, PPM or whichever code is chosen to encode the measurand.

The processor 220 takes the signal from the sensor 210 and processes it to drive the modulation code generator.

In another embodiment, the materials are chosen to degrade or dissolve in the environment, to minimise any residue left after the device's useful life is completed.

Modulation to Encode the Measurand

To encode the measurand (e.g. water depth) the sensor device is arranged to move the whole wavelength code periodically up or down in wavelength. For example, a nominal reflection wavelength of 800 nm could be periodically shifted to 805 nm, and 810 nm to 815 nm etc. The whole code is shifted by the same amount (in this example, 5 nm). This shift can be detected by the scanning receiver device.

Figure 19:
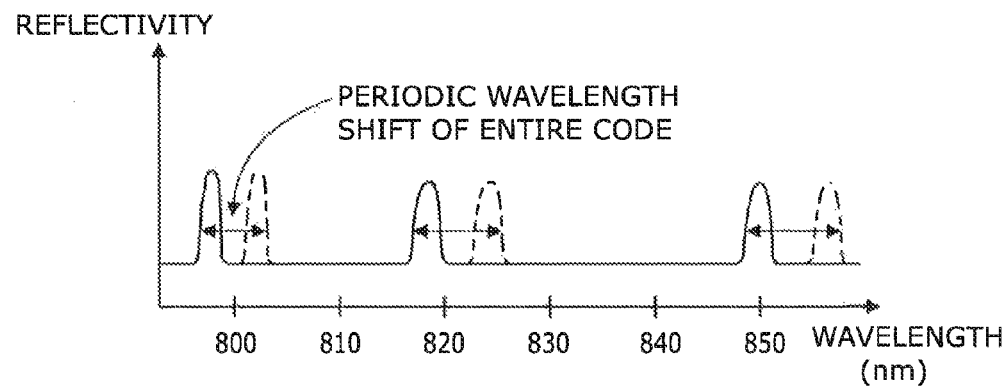
FIG. 19 is an illustration of modulation of the location of the peaks within each region that contains a digit to encode the sensed measurand.

FIG. 19 shows how the wavelength spectrum of a sensor can be shifted up or down the waveband, the peaks remaining the regions associated with each digit so the identity of the devices can still be determined.

The sensor pod 200 makes its measurement and then encodes the measurand onto the periodic wavelength shift of the grating. This could, for example, be done using well-known techniques such as Pulse Width Modulation (PWM), Pulse Position Modulation (PPM) or Manchester encoding. The scanning device will be able to distinguish this modulation from drift etc. as it is periodic.

Figure 20:
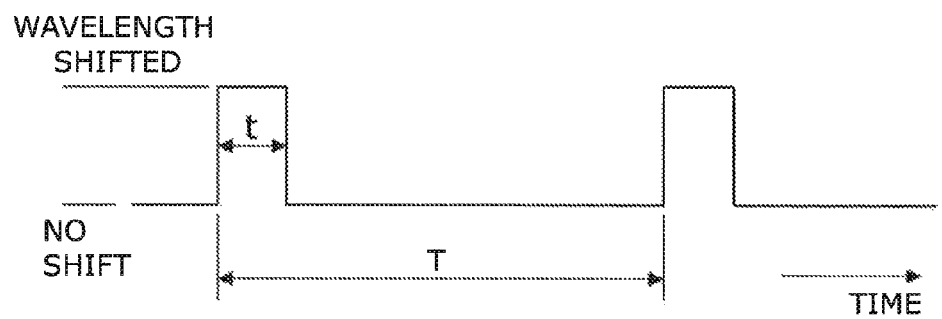
FIG. 20 is a similar illustration showing a time domain modulation scheme to encode the measurand.

FIG. 20 shows an example of how this would work, showing a typical PWM signal of period T, encoded onto the wavelength shift signal. The measurand modulates the pulse width t. For example, the water depth might be encoded so that a duty cycle of 10% (t=0.1T) corresponds to a depth of 0 m, and a duty cycle of 90% (t=0.9T) corresponds to a depth of 10 m.

It is important that the encoding frequency (1/T) is made to be sufficiently lower than the scanning frequency so that the scanning device can pick up the modulation, but not so slow that it is lost in background and environmental noise.

The monitoring device will be able to pick up this periodic wavelength shift and decode it. The signal will be able to be distinguished from background noise and unintended wavelength shifts by its periodic nature.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A remote sensor device comprising:
    at least one sensor that produces an output signal indicative of the value of a measurand;
    a reflective display that is positioned such that the reflective display is visible along a line of sight from a remote location, the reflective display comprising at least two retro-reflective reflector assemblies, each of which is arranged to reflect a variable fraction of radiation incident upon the reflective assembly back towards a source in response to respective control signals applied to the reflector assemblies,
    and in which each of the reflector assemblies preferentially reflects one wavelength of the incident radiation or preferentially removes at least one wavelength of the incident radiation that is not preferentially reflected or removed by the other reflector assembly,
    and further comprising modulating means for modulating the control signals applied to the reflector assemblies as a function of the value of the output signal from the sensor so as to modulate fractions of incident light reflected by the display.

2. The remote sensor device according to claim 1 in which each of the reflector assemblies of the display comprises two or more individual reflector devices, each reflector device being controllable by the control signals between a first state in which the reflector device reflects light back along a first path and a second state in which a smaller proportion of incident radiation is reflected back along the first path.

3. The remote sensor device according to claim 2 in which each of the reflector devices comprises a mirror that in use is altered between the first state and the second state by a respective transducer which in response to a control signal moves the mirror between two positions, a first position corresponding to the first state and a second position corresponding to the second state.

4. The remote sensor device according to claim 3 in which each of the reflector devices comprises a micro-electrical mechanical device in which the mirror is secured to a transducer comprising a deformable substrate, the substrate deforming when a control signal is applied to the substrate to deform or move the reflector device.

5. The remote sensor device according to claim 4 in which each reflector device includes a shutter which in the first state permits incident radiation to be retro-reflected from the reflector device and in the second state blocks light from being retro-reflected by the reflector device.

6. The remote sensor device according to claim 1 in which each reflector assembly includes a filter, each filter having a different wavelength response, the wavelength response defining the preferential wavelength that each reflector assembly preferentially reflects or removes, and in which optionally the display is retro-reflective.

7. The remote sensor device according to claim 1 in which the modulating means is adapted to modulate the control signals applied to the reflector assemblies as a function of a code representing an identity of the remote sensor device.

8. The remote sensor device according to claim 1 in which the control signals cause the display to encode the output signal and/or the identity of the device using amplitude modulation of retro-reflected fractions of incident radiation.

9. The remote sensor device according to claim 8 in which the amplitude modulation applied by the modulation means comprises varying the fraction of incident radiation retroreflected from one or more or all of the reflector assemblies so that the relative fractions of radiation retro-reflected by each of the assemblies at a given moment in time encodes the output signal or encodes a value indicative of an identity of the remote sensor device.

10. The remote sensor device according to claim 9 in which each reflector assembly preferentially reflects a visible wavelength of incident light and in which the amplitude modulation varies the perceived colour of the overall display to encode the output signal or to encode a value indicative of an identity of the remote sensor device.

11. The remote sensor device according to claim 1 in which the modulation means is arranged to generate control signals that cause the reflector assemblies to be periodically switched into and out of a reference state in which the fractions reflected by the reflector assemblies has a defined pattern.

12. The remote sensor device according to claim 11 in which the defined pattern of fractions is indicative of the identity of the remote sensor device.

13. The remote sensor device according to claim 11 in which the modulation means generates control signals that vary the timing of the switching into, or out of, or both into and out of the reference state, the timing encoding information in the display.

14. The remote sensor device according to claim 13 in which the modulation of the switching between states comprises a pulse width modulation encoding scheme.

15. The remote sensor device according to claim 14 in which the information is encoded as a function of a mark space ratio of the two states encoding information.

16. The remote sensor device according to claim 14 in which the pulse width modulation encodes the output signal value or encodes a unique identity value assigned to the device in the display.

17. The remote sensor device according to claim 11 in which the defined pattern in the reference state corresponds to a pattern in which all of the reflector assemblies reflect a maximum fraction of incident radiation that the reflector assemblies are able to reflect, or reflect a minimum fraction of incident radiation.

18. The remote sensor device according to claim 1 that further includes a processing circuit which includes a code generator which receives as an input the output signal from the sensor and produces at an output a coded signal that is used by the modulating means to modulate the fractions of incident radiation reflected the assemblies of the reflective display.

19. The remote sensor device according to claim 18 that further includes a battery that powers the sensor, a battery that powers the processing circuit and a battery that powers the means for modulating the display.

20. A monitoring apparatus configured for use in combination with the remote sensor device of claim 1, the monitoring apparatus comprising:
  a detector responsive to incoming radiation across a range of wavebands that has been reflected from a reflective display of the remote sensing device,
  a processor which receives an output signal from the detector and which processes the output signal to identify the presence or absence of a peak or trough within each of a set of defined regions of wavelengths within the band of wavelengths,
  the peaks or troughs corresponding with the preferentially reflected or removed fractions of incident light upon the remote sensor device,
  and in which the processor is adapted to determine the value of an encoded signal from the sensor device from the fractions of incident radiation reflected by each of the reflector assemblies of the remote sensor device.

21. The monitoring device according to claim 20 that includes a source of radiation which emits radiation across the band of wavebands preferentially reflected by the remote sensor device.

22. A method of communication between a remote sensing device and a monitoring device comprising:
  providing a monitoring device having an optical detector, and
  providing a remote sensor device according to claim 1 and the method further comprising the steps of:
  illuminating the display of the device with radiation from a source;
  detecting the radiation reflected back from the display onto the detector of the monitoring device; and
  analysing the reflected radiation to decode the information encoded in the reflected light received from the display of the remote sensor device.

* * * * *